United States Patent
Paraschiv et al.

(10) Patent No.: US 11,360,824 B2
(45) Date of Patent: Jun. 14, 2022

(54) CUSTOMIZED PARTITIONING OF COMPUTE INSTANCES

(71) Applicant: Amazon Technologies, Inc., Seattle, WA (US)

(72) Inventors: Andra-Irina Paraschiv, Braila (RO); Matthew Shawn Wilson, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 259 days.

(21) Appl. No.: 16/692,455

(22) Filed: Nov. 22, 2019

(65) Prior Publication Data
US 2021/0157652 A1 May 27, 2021

(51) Int. Cl.
*G06F 9/455* (2018.01)
*G06F 9/50* (2006.01)

(52) U.S. Cl.
CPC ........ *G06F 9/5077* (2013.01); *G06F 9/45558* (2013.01); *G06F 9/5027* (2013.01); *G06F 2009/45562* (2013.01); *G06F 2009/45595* (2013.01)

(58) Field of Classification Search
CPC .. G06F 9/5077; G06F 9/45558; G06F 9/5027; G06F 2009/45562; G06F 2009/45595; G06F 2009/45566
See application file for complete search history.

(56) References Cited

U.S. PATENT DOCUMENTS

| | | | |
|---|---|---|---|
| 8,479,196 B2 | 7/2013 | Day, II et al. | |
| 8,484,639 B2 | 7/2013 | Huang et al. | |
| 8,490,090 B2 | 7/2013 | Ben-Yehuda et al. | |
| 8,819,677 B2 | 8/2014 | Day, II et al. | |
| 9,122,509 B2 | 9/2015 | Deng et al. | |
| 9,342,343 B2 | 5/2016 | Sonnek | |
| 10,162,657 B2 | 12/2018 | Fukushima | |
| 2011/0047544 A1 | 2/2011 | Yehuda et al. | |
| 2011/0153909 A1 | 6/2011 | Dong | |
| 2012/0047313 A1* | 2/2012 | Sinha | G06F 9/45558 711/6 |
| 2012/0117566 A1* | 5/2012 | Maeda | G06F 21/53 718/1 |
| 2014/0019968 A1* | 1/2014 | Deng | G06F 9/45558 718/1 |
| 2014/0229943 A1 | 8/2014 | Tian et al. | |

(Continued)

OTHER PUBLICATIONS

Wikipedia, "Memory ballooning", Retrieved from https://en.wikipedia.org/wiki/Memory_ballooning, Oct. 10, 2019, pp. 1.

(Continued)

*Primary Examiner* — Dong U Kim
(74) *Attorney, Agent, or Firm* — Robert C. Kowert; Kowert, Hood, Munyon, Rankin & Goetzel, P.C.

(57) ABSTRACT

At a virtualization host which includes an instance partitioning controller, a set of resources is allocated to a compute instance by a virtualization manager. The first compute instance does not include another virtualization manager. In response to a communication from the controller, the virtualization manager allocates a subset of the resources to a child compute instance launched at the virtualization host. An application is executed within the child compute instance.

20 Claims, 11 Drawing Sheets

(56) References Cited

U.S. PATENT DOCUMENTS

| | | | |
|---|---|---|---|
| 2017/0078204 A1* | 3/2017 | Judge | H04L 47/11 |
| 2017/0090971 A1* | 3/2017 | Liguori | G06F 9/5016 |
| 2019/0340031 A1 | 11/2019 | Ganteaume | |
| 2020/0007460 A1 | 1/2020 | Guim Bernat et al. | |

OTHER PUBLICATIONS

Microsoft Docs, "Run Hyper-V in a Virtual Machine with Nested Virtualization", Retrieved from https://docs.microsoft.com/en-US/virtualization/hyper-v-on-windows/user-guide/nested-virtualization, Oct. 10, 2019, pp. 1-8.

Altaro, "VMware Hot-Add: How and When to Use it", Retrieved from https://www.altaro.com/vmware/vmware-hot-add/, Oct. 23, 2019, pp. 1-6.

International Search Report and Written Opinion from PCT/US2021/012140, dated Mar. 31, 2021, Amazon Technologies, Inc., pp. 1-17.

Kourai, Kenichi, et al, "Seamless and Secure Application Consolidation for Optimizing Instance Deployment in Clouds," 2016 IEEE 8th International Conference On Cloud Computing Technology and Science Kcloudcom), Dec. 12, 2016, pp. 318-325, IEEE.

U.S. Appl. No. 16/737,780, filed Jan. 8, 2020, Andra-Irina Paraschiv et al.

* cited by examiner

Partitioning-enabled parent CI launch procedure 460

Child compute instance launch procedure 461

CUSTOMIZED PARTITIONING OF COMPUTE INSTANCES

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines (also known as compute instances) hosted by the single virtualization host. Each such compute instance may represent a software simulation acting as a distinct logical computing system that provides users with the illusion that they are the sole operators of a given hardware computing resource, while also providing application isolation and security among the various compute instances. Instantiating several different compute instances on the same host may also help increase the overall hardware utilization levels at a data center, leading to higher returns on investment.

In some cases, a virtualized computing service may enable clients to choose from among a variety of pre-defined categories of compute instances. Such categories may, for example, differ from one another along dimensions such as compute power, memory, storage, support for specific kinds of virtualization techniques and the like. Instances of each category may be set up at the request of clients using a set of standardized virtualization servers selected by the operators of the virtualized computing service.

Figure 1:
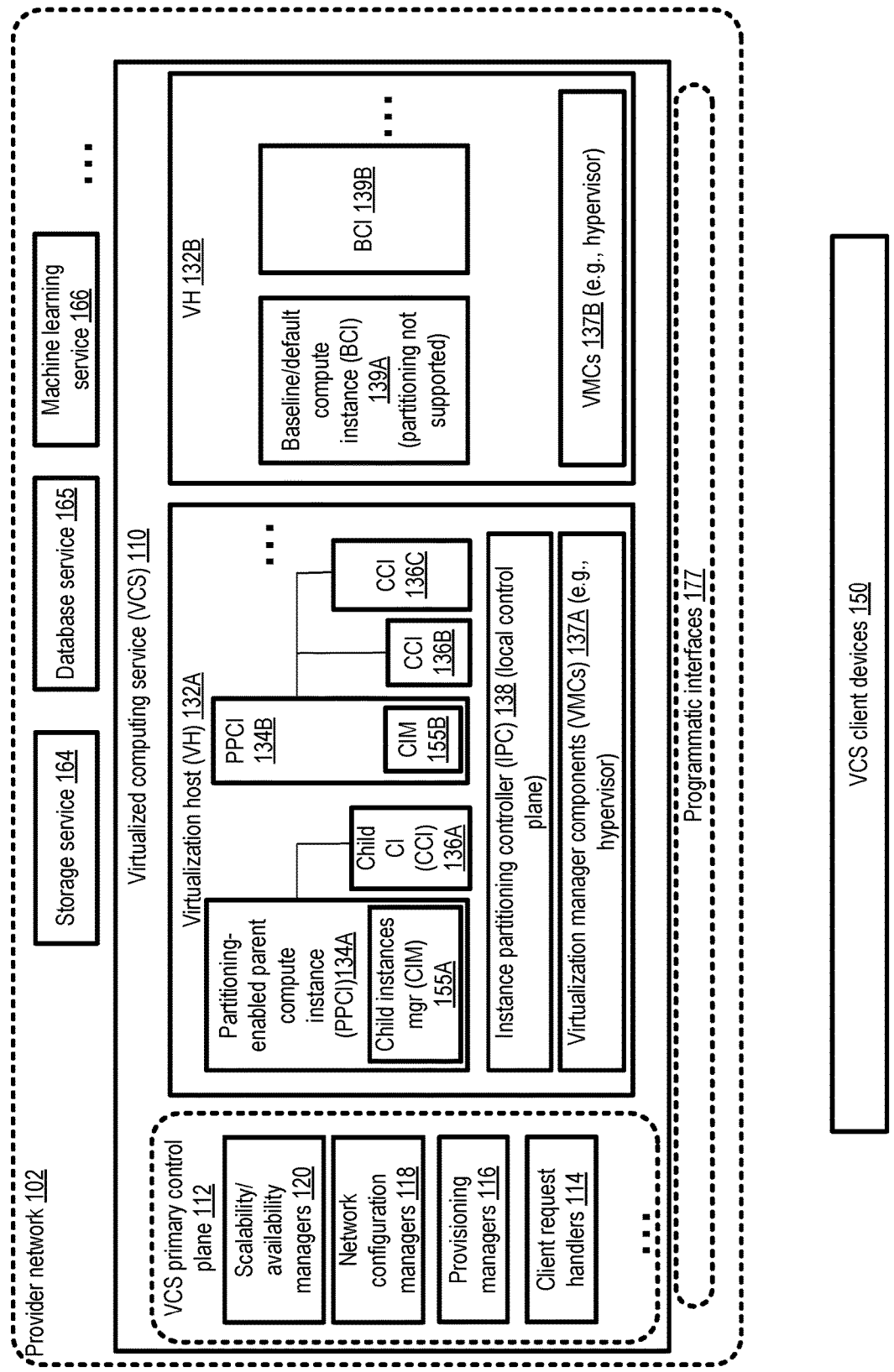
FIG. 1 illustrates an example system environment in which custom partitioning of compute instances based on client-selected parameters may be supported at a virtualized computing service, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for implementing customized partitioning of compute instances launched at the hosts of a virtualized computing service. A compute instance (referred to as a "parent" compute instance) such as a virtual machine may be instantiated at a virtualization host of the service on behalf of a client, and allocated a set of resources (e.g., CPUs, memory, storage, etc.), based for example on a resource specification of a particular category of a set of pre-defined instance categories of the service. Depending on the needs of the applications of the client, it may be beneficial from the client's perspective to partition or redistribute the set of resources among multiple compute instances, while avoiding the overhead of traditional nested virtualization techniques. For example, one or more "child" compute instances may be set up using respective subsets of the resources that were initially assigned to the parent compute instance, and run at the same level of the software stack as the parent. Such partitioning may be useful for a number of reasons: for example, to provide separation of functionality (by dedicating individual child compute instances to respective types of operations such as network message processing, storage service accesses and the like), to perform some types of computations in a highly secure environment (such as isolated child compute instances that are not permitted to communicate over a network and are thus less susceptible to network attacks), to better handle temporal variations in the amount of work of a particular type to be performed, and so on. The partitioning may be described as "custom" because the manner in which the parent compute instance's resources are redistributed may be determined and specified by the client—that is, the allocation of resources to child compute instances may not be limited by a set of pre-defined specifications of the virtualized computing service. As a result, clients may be able to flexibly tailor parent-child compute instance combinations to meet application-specific needs. If and when a child compute instance is terminated, its resources may be returned transparently to the parent compute instance.

To enable compute instances to be set up and administered, virtualization manager components may be configured at the virtualization hosts of a virtualized computing service (VCS) (e.g., including a hypervisor running on the primary CPUs of the virtualization host, or virtualization manager components run at offloading cards) in various embodiments. In order to facilitate efficient redistribution of parent compute instance resources, at least two types of additional software components may be instantiated within a virtualization host in some embodiments: a child instances manager (CIM) (which may for example comprise one or more user-mode processes within a parent compute instance), and one or more instance partitioning controllers (IPCs) responsible for performing some types of administrative tasks associated with requests for child compute instances. The CIM may provide easy-to-use programmatic interfaces for requesting launches or terminations of child compute instances from within a parent compute instance, for viewing the status of child compute instances, and so on. The IPCs may represent a local version of the control plane or administrative logic of the virtualized computing service, so that for example verifications/validations associated with requests for configuration of child compute instances with partitioned subsets of parent instance resources can be performed locally without over-the-network calls to remote control plane servers. Parent compute instances may also be referred to as "primary" compute instances, while child compute instances may also be referred to as "secondary", "dependent" or "non-primary" compute instances in some embodiments.

In contrast to traditional nested virtualization techniques, only a single layer of virtualization manager components (e.g., a single hypervisor) may be employed in at least some embodiments in which custom instance partitioning is implemented. As a result, when custom instance partitioning is used, the length of the software path (e.g., the number of layers of software traversed) to access hardware devices of the virtualization host from a process running within a child compute instance may be very similar to the length of the software path to access hardware from a process running within a parent compute instance. In contrast, in at least some conventional nested virtualization techniques, a second hypervisor may be launched within a parent compute instance to enable a nested compute instance to be set up; consequently, multiple hypervisors may have to be traversed to access hardware devices from the nested compute instance, making such accesses much less efficient.

As one skilled in the art will appreciate in light of this disclosure, certain embodiments may be capable of achieving various advantages, including some or all of the following: (a) substantially improving the performance of applications run at child compute instances relative to at least some nested virtualization techniques, by reducing the number of intermediary layers to be traversed to access hardware devices from the application; (b) reducing the amount of networking and other resources utilized to configure a collection of compute instances required for a client's applications, e.g., by eliminating at least some interactions with the primary control plane servers of a virtualized computing service, (c) enhancing the security of sensitive computations, by enabling dedicated isolated child compute instances to be set up for such computations, and (d) improving the user experience of clients that wish to configure child compute instances, e.g., by providing easy-to-use tools such as child instances managers and the ability to set up custom resource configurations for the child compute instances.

Custom compute instance partitioning of the kind introduced above may be supported at the computing platforms of a virtualized computing service (VCS) within data centers or other premises of a provider network in at least some embodiments. The term "provider network" (sometimes simply called a "cloud") refers to a large pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. The resources of a provider network may in some cases be distributed across multiple data centers, which in turn may be distributed among numerous geographical regions (e.g., with each region corresponding to one or more cities, states or countries). For example, a cloud provider network can be formed as a number of regions, where a region is a geographical area in which the cloud provider clusters data centers. Each region can include two or more availability zones connected to one another via a private high speed network, for example a fiber communication connection. An availability zone refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the cloud provider network via a publicly accessible network (e.g., the Internet or a cellular communication network).

According to at least some embodiments, a system may comprise one or more computing devices of a cloud provider network. The computing devices may include instructions that upon execution on or across one or more processors cause the computing devices to configure, at a virtualization host of a virtualized computing service (VCS), one or more virtualization manager components (VMCs) (such as a hypervisor) and an instance partitioning controller (IPC). The VCS may comprise a set of administrative servers and/or other administrative resources in various embodiments, separate from the virtualization host, referred to as the primary control plane of the VCS; communications between the primary control plane and the virtualization host may require messages to be transferred over a network. The IPC may serve as a local control plane component running at the virtualization host, which can perform some administrative tasks locally without requiring interactions with the primary control plane. The VMCs may allocate a set of resources of the virtualization host to a parent compute instance at the virtualization host in response to a launch request directed to the primary control plane of the VCS. The set of resources may include, for example, one or more virtual processors and a memory portion. In at least some embodiments, the parent compute instance may not include other VMCs (e.g., a second hypervisor running within the parent compute instance itself) configured to implement nested virtualization.

Within the parent compute instance, a child instances manager (CIM) (e.g., comprising one or more user-mode processes) may be launched in various embodiments. In response to receiving a programmatic request to establish a child compute instance of the parent compute instance, the CIM may transmit a corresponding launch request to the IPC in some embodiments. The IPC may validate the request from the CIM using local resource allocation metadata maintained at the virtualization host, without communicating with the primary control plane of the VCS in at least some embodiments. If the request for the child compute instance is successfully validated, the IPC may transmit one or more messages pertaining to the requested child compute instance to the VMCs. In response to such communications from the IPC, the VMCs may allocate a subset of the resources of the parent compute instance to a child compute instance launched at the virtualization host by the VMCs in various embodiments. For example, one or more virtual CPUs, or a subset of the total memory that was allocated to the parent compute instances may be designated for use by the child compute instance. The client on whose behalf the child compute instance was set up may be provided information programmatically about the child compute instance by the CIM, e.g., including an identifier of the child compute instance, networking information enabling communications with the child compute instance, information about applications being run within the child compute instance, status information about the child compute instance (e.g., whether the child compute instance is running, paused, etc.), resource consumption metrics of the child compute instance, and so on.

A compute instance within which a CIM is instantiated may be referred to as a "partitioning-enabled" parent compute instance (PPCI) in some embodiments. A PPCI and its set of child compute instances (CCIs) may be referred to as a partitioning-based family of compute instances (PFCI), or simply as a family of compute instances. In at least one embodiment, a VCS client may provide a representation or specification of a device model to be implemented for the child compute instance (CCI) to the CIM, e.g., as part of a request to launch the CCI submitted from a process running within the PPCI. The device model may for example indicate a list of virtual devices to be set up for the CCI, such as various low-level networking-related devices, storage-related devices and the like. The virtual devices indicated for the CCI may comprise a subset of the virtual devices set up for the PPCI in some cases. The devices indicated in the device model specification may be configured at the CCI in various embodiments, e.g., with the help of the VMCs of the host.

In at least some embodiments, a client may also provide a communications specification for the CCI in a programmatic request directed to the CIM or the VCS control plane, indicating the number and kinds of communication channels to be set up for use by the CCI. Such communication channels may, for example, include one or more local channels (e.g., comprising buffers or portions of shared memory to which messages can be written by the CCI and/or from which messages can be read by the CCI) for interactions among the members of the partitioning-based family of the CCI. Such channels may be used for PPCI-to-CCI communications and/or CCI-to-CCI communications in various embodiments. In at least some embodiments, a number of networking channels may also be set up for the CCI to communicate with external entities (processes or devices external to the virtualization host, or external to the PFCI) based on programmatic requests from the client. The networking channels may for example require Internet Protocol (IP) addresses to be assigned to the CCIs, programmatic attachment of virtual network interfaces (VNIs) to the CCIs, and/or other configuration operations. Note that in at least some embodiments, multiple PFCIs, each comprising one or more PPCIs and zero or more CCIs, may be launched at a given virtualization host, and communication channels (local or network-based) may be set up for communications between one or more instances of different PFCIs based on client-submitted requests.

According to some embodiments, a client may indicate a particular machine image to be used for a CCI. For example, a client may generate a custom machine image (different from the pre-defined images used for standardized compute instances of the VCS) for a CCI, and provide an identifier or location of the custom machine image to the VCS or CIM as part of a request to launch the CCI. The specified custom machine image may be used to instantiate the CCI at the virtualization host in various embodiments. In at least one embodiment, the VCS may perform one or more validation checks on the specified machine image before utilizing it to launch a CCI. In some embodiments, one or more of the following kinds of preparatory operations may be performed at the VCS with respect to machine images for CCIs. An image format header may indicate the expected formats of various sections of the image in one embodiment, and the VCS may ensure that the sections are correctly formatted according to the header information. A machine image to be used for a CCI may be signed cryptographically, and the signer's identity and authenticity as well as the integrity of the image may be verified. In at least some implementations the machine image may be encrypted, and the VCS may decrypt the image before using it for launching a CCI.

In various embodiments, a client may decide to terminate a CCI after it has performed a desired set of operations. In such a scenario, when a given CCI is terminated, the resources that had been dedicated to that CCI may be returned to the PPCI (e.g., made accessible again from the PPCI, or re-allocated to the PPCI). Note that the combination of resources that are allocated to a PFCI may exceed the resources that are allocated to the PPCI by the VMCs in at least some embodiments—that is, a client may decide to overcommit some resources if desired. For example, if PPCI is allocated 16 gigabytes of memory, a client may nevertheless decide to allocate 4 gigabytes each to five different CCIs of the PPCI if desired, thus in effect allocating 20 gigabytes to the CCIs (in addition to the memory used by the PPCI itself). In some embodiments, the IPC or the VMCs may reject a request to configure a CCI based on the extent to which resources have already been committed at the virtualization host, e.g., using locally stored resource allocation metadata at the virtualization host. In at least one embodiment, the CIM of a PPCI may provide one or more programmatic interfaces that allow clients to view the allocated resources of the CCIs of the PPCI and/or the utilization levels of such resources, so the client can implement a more informed strategy with respect to resource allocation for new CCIs.

In one embodiment, a client may adjust (increase or decrease) resources dynamically for a running CCI by submitting a programmatic request to the CIM. In at least one embodiment, a client may submit a programmatic request to adjust (increase or decrease) the resources of a PPCI dynamically, and the VCS may make the requested modifications—e.g., using "hot add" or "hot plug" techniques for adding additional processors or memory. In one embodiment, a client may submit such a programmatic request to add resources to a PPCI to enable subsets of the resources of the PPCI to be partitioned dynamically for use by CCIs. For example, a sequence of operations similar to the following may be performed in such an embodiment: (a) in response to a launch request for a PPCI, a first set of resources RS1 may be allocated to the PPCI by the VMCs at a selected virtualization host; (b) a first CCI, CCI-1, may be allocated a subset of RS1 by the VMCs, resulting in resource set RS2 (where RS2 comprises fewer resources than RS1) remaining accessible from the PPCI; (c) in response to a programmatic resource expansion request for the PPCI, the VMCs may configure additional resources for the PPCI, resulting in resource set RS3 (where RS3 comprises more resources than RS2) becoming accessible from the PPCI, and (d) a second CCI, CCI-2, may be allocated a subset of RS3 (including some of the recently-added resources) by the VMCs, resulting in resource set RS4 (where RS4 comprises fewer resources than RS3) remaining accessible from the PPCI, and so on. In other embodiments, dynamic increases/decreases of resources for compute instances (PPCIs and/or CCIs) may not be supported.

CCIs may be used to perform any of a variety of categories of tasks in different embodiments. In one scenario, for example, a CCI may be used as an intermediary between other compute instances of its PFCI and one or more storage devices (e.g., storage devices of a network-accessible storage service of the provider network). As such, the CCI may access one or more storage devices of the storage service in response to requests from its parent CCI or other CCIs of the parent, and provide results obtained from the storage devices. In one embodiment, a CCI may similarly be used as the intermediary between the other CIs of the PFCI and one or more local storage devices of the virtualization host.

In one embodiment, a client may request that a particular CCI be prevented from communication over a network, so that for example security-sensitive computations can be performed within that CCI. In response to a request for such an isolated CCI, networking devices/addresses may not be set up for the CCI in various embodiments, and only local channels of communications may be used to access the CCI (e.g., to transfer security artifacts such as cryptographic keys to the CCI for the sensitive computations, and to obtain results of such sensitive computations). Similarly, in at least some embodiments, one or more CCIs may not be provided access to persistent storage devices, to further enhance the security of applications run at such CCIs.

In some embodiments, the provider network at which custom partitioning of compute instances is implemented may support functional programming techniques for certain types of applications. In a functional programming methodology, a client of a computing service may simply specify the function or programs to be executed on the client's behalf, without acquiring any specific computing resources in advance. The service may then dynamically select appropriate computing resources, cause the function or program to be executed at the selected resources, and provide the results to the client. In at least one embodiment, a CCI may be created to run such a function or program on demand, and the CCI may be terminated after the results of the function or program are obtained. The PPCI may include one or more functional programming orchestration managers in such embodiments, configured to receive programmatic representations of functions to be implemented to perform a computation on behalf of a client. The functional programming orchestration manager (e.g., comprising one or more processes or threads) may cause a specified function to be executed or implemented at a CCI launched for the function, and terminate the CCI after the function has been executed and results or output of the function have been collected.

In at least one embodiment, a CCI may be set up to run a software container. A software container includes the code of an application, as well as additional artifacts on which the application depends, so that the application can be run quickly and transferred reliably from one computing environment to another. The PPCI may include a container manager comprising one or more processes or threads in such embodiments. The container manager may receive an indication (e.g., a container image identifier) of the desired software container programmatically from a client and cause the container to be run within a CCI launched specifically for the container.

A particular CCI of a PFCI may be set up as a communication hub or intermediary for some subset or all of the other CIs of the PFCI in some embodiments. As such, the hub CCI may receive messages from one or more external endpoints (endpoints outside the PFCI or outside the virtualization host), and forward the messages to the appropriate CI within the PFCI. Similarly, the hub CCI may receive outbound messages from the other CIs of the PFCI, and transmit them to external endpoints.

A number of different techniques may be used to allocate subsets of PPCI resources to CCIs in different embodiments. Such techniques may include, for example variants of memory ballooning, hot plugging/unplugging of memory or processors (which may also be referred to as "hot add" or "hot remove" of memory or processors), processor off-lining followed by on-lining, and so on. In one implementation of memory ballooning, a PPCI's kernel may implement a "balloon driver" which allocates unused memory within the PPCI's address space to a reserved memory pool referred to as the "balloon", so that the memory in the pool is no longer available to processes running within the PPCI itself. The physical memory mapped to the reserved pool may be unmapped from the address space of the PPCI, e.g., by the VMCs of the host, and made available to CCIs. The size of the balloon may be increased or decreased dynamically depending on the needs of the PPCI. In hot unplugging techniques, resources such as processors or memory may be dynamically taken away from one compute instance (such as the PPCI) and assigned to other compute instance (such as CCIs), without taking down or halting the source instances or the instances to which the resources are assigned. Similarly, processor off-lining may involve disallowing further use of a processor by a PPCI, while processor on-lining may involve assigning an off-lined processor to a CCI. After a CCI is terminated, processors that were allocated to the CCI may be returned to the PPCI in at least some embodiments, in an operation which represents the logical reversal of the processor off-lining and on-lining which were used to allocate the processors to the CCI earlier. In some embodiments, as mentioned earlier, if a client wishes to over-commit resources such as processors, off-lining and on-lining may not be required, as the same resource may in effect be shared by a PPCI and one or more of its CCIs.

In some embodiments, a single-tenant approach may be used with respect to IPCs—that is, a respective IPC may be launched by the VMCs at a virtualization host for each CCI requested by a client. In other embodiments, a multi-tenant approach may be used for IPCs, with a single IPC handling requests associated with multiple CCIs.

Example System Environment

FIG. 1 illustrates an example system environment in which custom partitioning of compute instances based on client-selected parameters may be supported at a virtualized computing service, according to at least some embodiments. As shown, system 100 includes resources of a network-accessible virtualized computing service (VCS) 110 of a provider network 102. The VCS 110 may include a plurality of virtualization hosts (VHs) 132, such as 132A and 132B, which may be used to launch compute instances on behalf of VCS clients. The provider network 102 may also include a number of other network-accessible services in some embodiments, such as a storage service 164, a database service 165, a machine learning service 166, and so on, which may be accessed from the compute instances if desired.

The compute instances and virtualization hosts 132 may be considered part of the data plane of the VCS 110, used primarily for client applications and associated data. In contrast to the data plane, the VCS may include a set of servers and/or other resources used for administrative tasks and referred to as the primary control plane 112 in the depicted embodiment. The primary control plane 112 may include, for example, scalability/availability managers 120, network configuration managers 118, provisioning managers 116, and/or client request handlers 114 in the depicted embodiments. The VCS may implement one or more programmatic interfaces 177 (e.g., web-based consoles, application programming interfaces (APIs), command-line tools, graphical user interfaces and the like) which may be used by VCS users or clients to submit programmatic requests for some types of compute instances, and receive corresponding responses in the depicted embodiment. Any of a variety of types of VCS client devices 150 (e.g., laptops, desktops, mobile computing devices, etc.) may be used to submit programmatic requests via programmatic interfaces 177 in the depicted embodiment. Some implementations of the VCS can provide an API for requesting a child instance having specific resource allocations from its parent instance, as described herein, or for requesting that a child instance be automatically spawned for certain functions or processes triggered by the parent instance. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network.

Request handlers 114 of the primary control plane 112 may perform some initial checking (e.g., to verify that the client has permissions for the kinds of operations being requested), and then pass on internal versions of the request to one or more other components of the control plane for implementation. The provisioning managers 116 may, for example, be responsible for identifying a specific virtualization host (VH) 132 at which one or more compute instances are to be launched in the depicted embodiment. Network configuration managers 118 may be responsible for setting up connectivity between the compute instances 134 and other entities inside and outside the provider network 102 in various embodiments, including for example connectivity with storage services 164 and/or other services of the provider network. Scalability and availability managers 120 may be responsible for automatically modifying the configurations of compute instances and other resources, e.g., based on load balancing considerations, increases or decreases in workloads, and so on. In some embodiments, the primary control plane 112 may also include migration managers that transfer at least some categories of compute instances between virtualization hosts, e.g., based on analysis of collected metrics and/or based on requests from VCS clients.

In the embodiment depicted in FIG. 1, the VCS may support several different categories of compute instances. Some categories may allow subsets of the resources allocated to a given compute instance to be redistributed according to client-specified preferences among one or more child compute instances. Such compute instances, whose resources may be partitioned in a customized manner based on client-submitted requests, may be referred to as partitioning-enabled parent compute instances (PPCIs). For example, at virtualization host 132A, some resources of PPCI 134A may be granted to child compute instance (CCI) 136A, and respective subsets of resources of PPCI 134B may be allocated to CCIs 136B and 136C. Other categories of compute instances may not support partitioning, and may be referred to as baseline or default compute instances (BCIs). For example, BCIs 139A and 139B may be set up at virtualization host 132B in response to client requests. Note that at least in some embodiments, the VCS may define a number of instance categories, distinguished from each other along various dimensions such as computing capacity, memory capacity, storage capacity, networking capacity, operating system type, virtualization techniques used, and so on. In one trivial example scenario, the VCS may support "small", "medium" and "large" compute instance categories, with medium instances having twice the computing capacity (expressed for example using standardized computing units also defined by the VCS) as small instances, and large instances having twice the computing capacity of medium instances. In one embodiment, some or all of such predefined categories of compute instances may also be used as PPCIs. In other embodiments, PPCIs may represent a distinct category of compute instances among the set of supported categories.

Virtualization hosts 132 may comprise respective sets of virtualization manager components (VMCs) 137 (such as hypervisors) in the depicted embodiment. VH 132A includes VMCs 137A, while VH 132B includes VMCs 137B, for example. In some embodiments, the VMCs at a given VH 132 may utilize the primary physical processors (CPUs or cores) of the VH. In other embodiments, at least a subset of virtualization management tasks may be offloaded to peripheral cards (e.g., cards connected to the primary physical processors via a peripheral bus such as a PCI (Peripheral Component Interconnect) bus or a PCIe (PCI-express) bus), so that more of the computing capacity of the primary physical processors remains available for the compute instances.

To support partitioning of PPCI resources, one or more instance partitioning controllers 138 may be configured at a given VH 132 in the depicted embodiment in addition to the VMCs 137, and a set of one or more tools referred to as a child instance manager (CIM) may be launched within each PPCI. For example, CIM 155A may be configured within PPCI 134A, and CIM 155B may be set up within PPCI 134B. IPCs 138 may be launched by, and represent separate processes from, the VMCs 137 in at least some embodiments. In some implementations, a CIM 155 may comprise one or more user-mode processes. In other implementations, a CIM 155 may include one or more kernel-mode daemons, threads or processes, e.g., in addition to or instead of user-mode processes. VCS clients may submit requests to launch PPCIs to the primary control plane 112 in the depicted embodiment, and the requested PPCIs may be instantiated at a virtualization host 132 by the VMCs of the virtualization host. In contrast, after a PPCI 134 has been launched by the VMCs and a CIM 155 has been started up within the PPCI 134, requests for CCIs may be submitted directly to the CIM 155 in at least some embodiments, bypassing the primary control plane 112.

A client's request to launch a PPCI 134 may indicate, e.g., based on a parameter identifying a pre-defined compute instance category for the PPCI 134, a set of resources to be allocated to the PPCI 134 in various embodiments. Accordingly, when the VMCs 137 instantiate a PPCI 134, the requested set of resources (virtual CPUs, memory, storage etc.) may be allocated to the PPCI 134. Similarly, a set of resources may also be allocated for use by a BCI 139 by the VMCs 137 of its VH 132, based for example on the particular category of BCI requested by the client. In some embodiments, the VCS may allow a client to explicitly specify the combination of resources to be allocated to a PPCI or a BCI, instead of requiring the client to select from among a list of pre-defined instance categories with respective resource configurations.

If/when a client wishes to configure a CCI 336 using a subset of resources of a PPCI 134, a programmatic request for the CCI may be sent to the CIM 155 at the PPCI. The programmatic request may include parameters that indicate the subset of PPCI resources to be set aside for the CCI, a machine image to be used for the CCI, and/or other properties of the CCI in various embodiments. The CIM may in some embodiments perform one or more validation operations on the request (e.g., to verify the syntax and the legality of the parameters of the request), and send on a corresponding CCI request to an IPC 138 at the VH 132A. The IPC 138 may perform its own validation of the request, and if the validation succeeds, send commands to the VMCs 137 to launch the CCI with a subset of the PPCIs' resources. In at least one embodiment, the validation operations performed for a requested CCI at the IPC 138 may be conceptually similar to some of the validation operations performed at the primary control plane 112 for a requested PPCI or BCI; hence, the IPC 138 may be referred to as a "local control plane" in such embodiments. Note that some of the kinds of tasks performed at the primary control plane for a requested BCI or PPCI may not be required for a requested CCI—e.g., there may be no need to provision a host (since the VH to be used for the CCI is already known). As such, only a subset of the functionality implemented at the primary control plane for launching compute instances may have to be implemented at the IPC 138 in at least some embodiments. Note that some functionality implemented at an IPC 138 (e.g., participation in the setting up of local communication channels) may not be required at the primary control plane in various embodiments—thus, IPC functionality may not necessarily represent a strict subset of primary control plane functionality.

In response to the communications from the IPC 138 with respect to a requested CCI, the VMCs 137 may utilize any of a number of different techniques, such as memory ballooning, hot-unplugging and plugging of processors, etc., to allocate the requested set of resources to a CCI launched at the VH 132. For example, some number of virtual CPUs, and some amount of memory of the PPCI may be designated for the use of the CCI launched by the VMCs in response to the IPC's messages. In at least some embodiments, components of the PPCI's operating system may also be involved in the allocation of CCI resources—e.g., the PPCI operating system may identify and set aside memory regions which can later be allocated to the CCI. One or more applications selected by the client may be run at each of the CCIs 136 in the depicted embodiment. Information about the CCIs, such as the status of the CCIs, the resource consumption of the CCIs, etc., may be provided by the CIM 155 to the client on whose behalf the CCIs are set up in various embodiments.

If and when desired, a client may terminate a CCI 136 by sending a programmatic request to the CIM 155 in the depicted embodiment. The termination request may be passed on to the VMCs 137 from the CIM. When the CCI is terminated by the VMCs 137, the resources that were allocated to the CCI may be returned to the PPCI 134 in at least some embodiments; such resources may, for example, be used for additional CCIs or used for the PPCI's own computations. In some embodiments, a partition-based family of compute instances (PFCI) comprising a particular PPCI 134 and any CCIs 136 configured using subsets of the PPCI's resources may be migrated as a unit from one virtualization host to another, e.g., in response to client requests or based on changing workload conditions, anticipated maintenance of the virtualization host currently being used, and so on.

In at least some embodiments, in addition to indicating the subset of PPCI resources that are to be allocated to a CCI, a VCS client may also provide other configuration requirements or preferences programmatically to the CIM. For example, a client may indicate (e.g., via a device model specification) the set of software devices (including networking devices, storage devices and the like) to be set up for the CCI, the types of communication channels to be set up for the CCI, and so on. The VMCs 137 may set up the requested devices per the device model specification, and create the communication channels (e.g., using shared memory for intra-PFCI communications, and networking configuration changes for communications with entities outside the PFCI) requested.

CCIs 136 may be set up for a variety of reasons in different embodiments. In some embodiments, one of the CCIs of a PFCI may act as an intermediary between the other compute instances of the PFCI and one or more services external to the VCS 110, such as a storage service 164, database service 165, or machine learning service 166. A CCI 136 may be configured as an intermediary, proxy or logical gateway for all external network traffic in some embodiments—e.g., all the inbound traffic directed at the PFCI may first be received at the intermediary CCI and then transferred on to other CIs of the PFCI, and/or all the outbound traffic from the other CIs may be sent to the intermediary CCI, and from the intermediary CCI to the destination. Some CCIs 136 may be set up primarily to perform highly sensitive computations, and may accordingly be prevented from accessing networks or even persistent storage devices. Other CCIs 136 may be launched for executing short-duration functions or programs in accordance with a functional programming methodology in one embodiment, and terminated after execution of the function or programs has been completed. One or more CCIs 136 may be used to run software containers in some embodiments.

Example Partitioning of Resources

Figure 2:
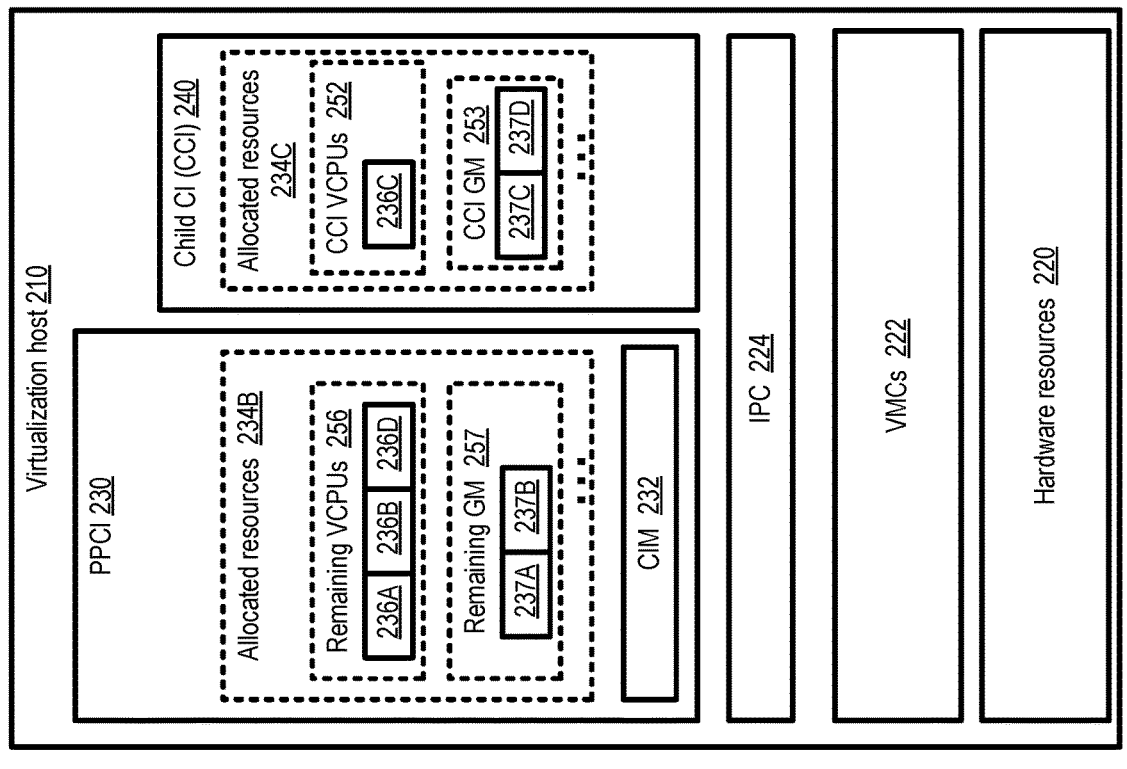
FIG. 2 illustrates an example distribution of a subset of resources, initially assigned to a parent compute instance at a virtualization host, to a child compute instance, according to at least some embodiments.
Figure 2:
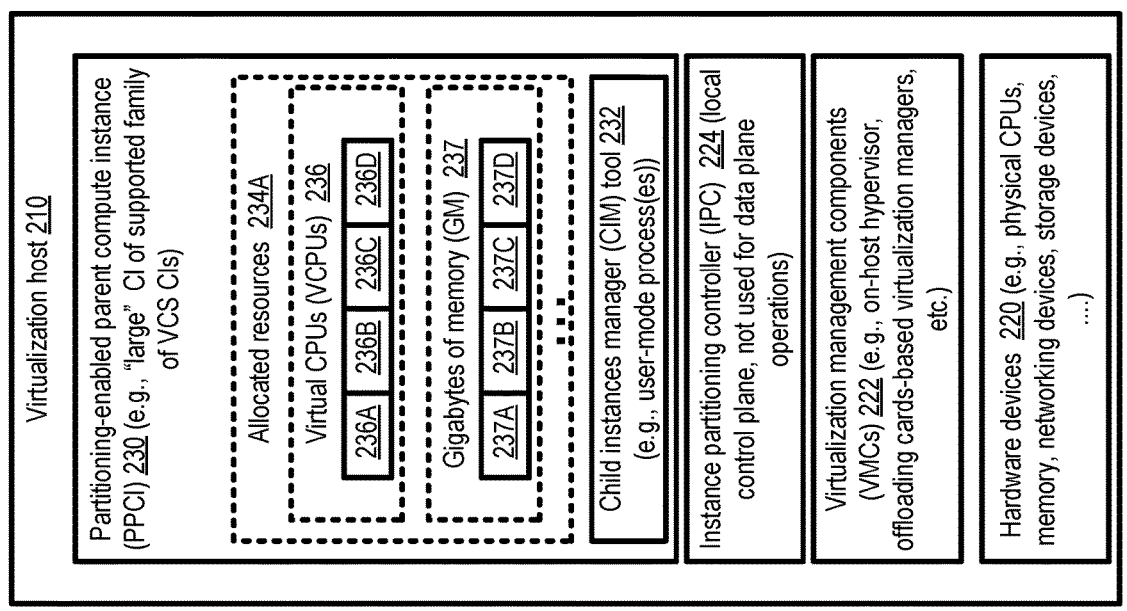

FIG. 2 illustrates an example distribution of a subset of resources, initially assigned to a parent compute instance at a virtualization host, to a child compute instance, according to at least some embodiments. In the depicted example scenario, a partitioning-enabled parent compute instance (PPCI) is set up at a virtualization host 210. The PPCI 210 may, for example, be instantiated in response to a programmatic request from a VCS client to set up a "large" compute instance selected from a family of pre-defined instance categories that includes "large", "medium" and "small" compute instances. For example, the cloud provider network may offer virtual compute instances with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type.

The virtualization host 210 may include a set of hardware devices 220 including physical CPUs, memory, networking devices such as network interface cards (NICs), storage devices, and so on. In some embodiments, virtualization management components (VMCs) 222 of the virtualization host 220 may include an on-host hypervisor (i.e., a hypervisor which runs on the CPUs of the host). In one embodiment, at least a subset of virtualization management tasks may be performed at one or more offloading cards so as to enable more of the processing capacity of the host 220 to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management, input/output virtualization, instance health monitoring, and the like.

In various embodiments, one or more instance partitioning controllers (IPCs) 224 may be set up at virtualization hosts 220 that are to be used for custom partitioning of compute instances. Other virtualization hosts, which are used for baseline or non-partitioned compute instances may not require such IPCs in at least some embodiments. A given IPC 224 may comprise, for example, one or more processes or threads launched by the VMCs 222 in some implementations. An IPC 224 may perform some operations for child compute instances (CCIs) analogous to those performed with respect to PPCIs at the primary control plane of the VCS. For example, just as some validation tasks may be performed at the primary control plane to ensure that sufficient resources are available at the VCS for a requested PPCI before the PPCI is launched, the IPC may perform validation tasks to ensure that sufficient free resources are available for a requested CCI before the CCI is launched. Note that some types of operations performed at the primary control plane need not be replicated at the IPC in at least some embodiments—for example, because the host at which a CCI is to be launched is known (a CCI is launched at the same host as its PPCI), provisioning of a host may not be required from the IPC, while such provisioning may be required from the primary control plane for a PPCI in at least some cases. In at least some embodiments, an IPC may only be used for control plane tasks related to a CCI—e.g., to approve the request to launch the CCI or a request to terminate the CCI. As such, the IPC may not be involved in data plane operations of the CCI in such embodiments; once the CCI is launched, the CCI may perform its computations without interacting with the IPC 224, using the VMCs 222 as needed to access hardware devices.

A child instances manager (CIM) tool 232 may be instantiated within the PPCI 230 in the depicted embodiment. The CIM 232 may implement programmatic interfaces which can be used by the VCS client on whose behalf the PPCI 230 is set up to submit requests pertaining to CCIs, to view status information of the CCIs, and so on. In at least some embodiments, the CIM 232 may comprise one or more user-mode processes.

In the example scenario shown in FIG. 2, the set of resources 234A initially allocated to PPCI 230 may include virtual CPUs 236A-236D as well as four gigabytes of memory 237A-237D. The number of virtual CPUs 236 and the amount of memory 237 allocated to the PPCI 230 may be based on the category (e.g., the "large" compute instance category) indicated by the VCS client in a launch request for the PPCI which was sent to the primary VCS control plane.

When the VCS client wishes to instantiate a CCI, a launch request for the CCI may be sent to the CIM tool 232 in the depicted embodiment, e.g., from a process running within the PPCI. The CCI launch request may indicate various parameters and properties of the requested CCI, including for example the subset of resources of the PPCI which are to be designated for use by the CCI. The CIM tool 232 may forward the request, or send a transformed version of the request, to the IPC 224. The IPC 224 may ensure, using local resource allocation metadata maintained at the virtualization host 210 (e.g., at the VMCs 222), that there are sufficient resources available for the CCI and/or perform other validation tasks pertaining to the CCI request. If the request is approved/validated, the IPC may send one or more messages or commands to the VMCs 222 to launch the requested CCI and allocate a subset of resources 234 to the newly-created CCI. In the depicted example scenario, one VCPU 236C is included in the set of CCI VCPUs of allocated resources 234C of CCI 240 by the VMCs 222, and two gigabytes of memory 237C and 237D are included in the CCI GM 253 of CCI 240. The resources 234B that remain available for the PPCI 230 include three VCPUs (236A, 236B and 236D) (labeled remaining VCPUs 256) and two gigabytes of memory 237A and 237B (labeled remaining GM 257). Other resources and/or software devices originally assigned to the PPCI may also be allocated for use by, or transferred to, the CCI 240 in some embodiments. New software devices may be created for the CCI 240 based on a device model specification indicated by the VCS client in some embodiments. In at least some embodiments, the subset of resources 234C allocated to the CCI may not be accessible or usable from the PPCI during the lifetime of the CCI.

CCI 240 may not include a CIM of its own in the depicted embodiment; as such, resources 234C may not be further partitioned to create additional CCIs from CCI 240. In other embodiments, CCIs may also include CIMs, and a multi-level hierarchy of CCIs may be created if desired by VCS clients. In at least some embodiments, if/when a given CCI is terminated, its allocated resources may be returned to its PPCI. In one embodiment, the allocated resources for a given CCI may instead be retained in a pool for use for additional CCIs, instead of being returned to the PPCI.

Comparison with Traditional Nested Virtualization

Figure 3:
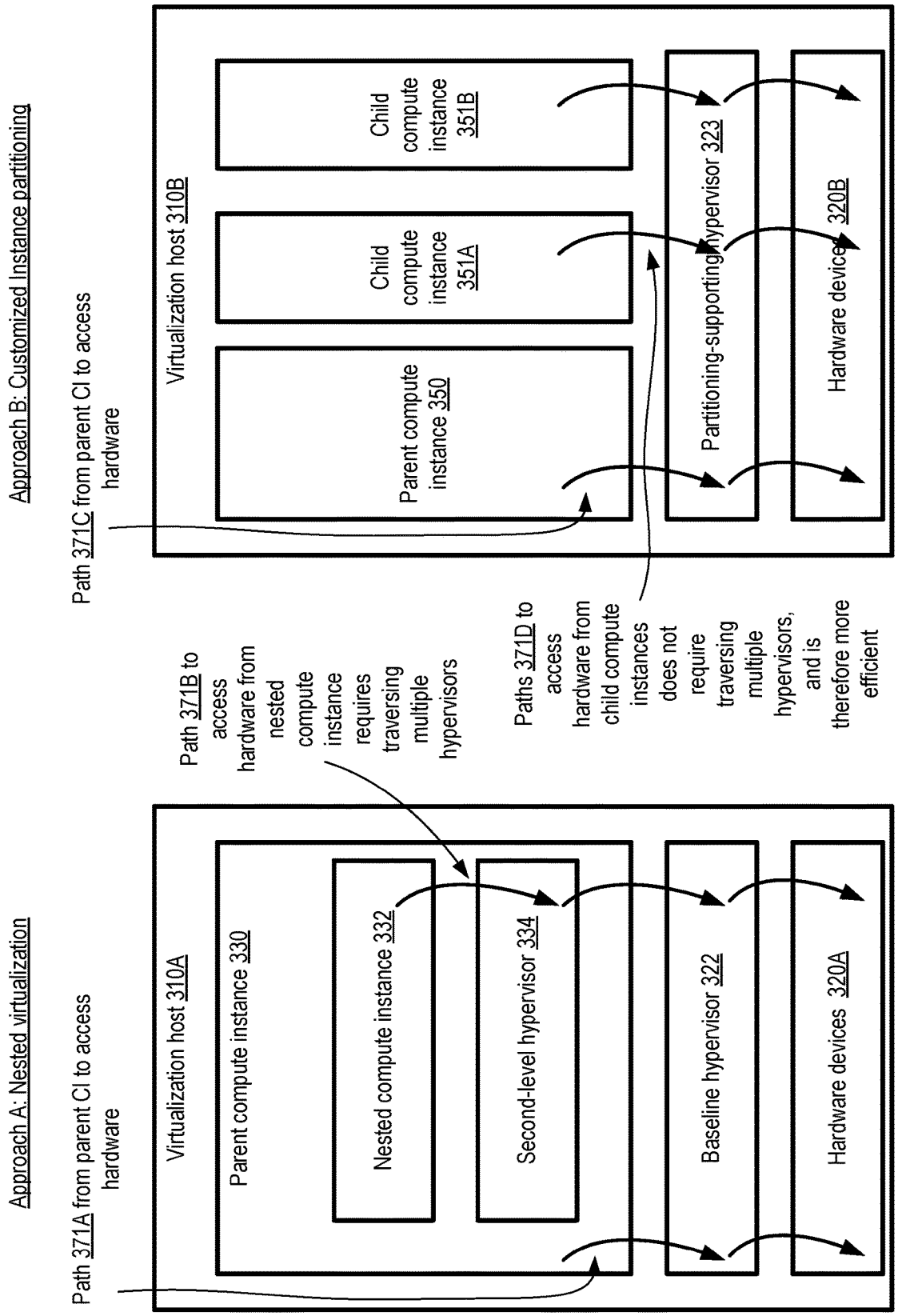
FIG. 3 illustrates an overview of differences between traditional nested virtualization techniques and customized instance partitioning, according to at least some embodiments.

FIG. 3 illustrates an overview of differences between traditional nested virtualization techniques and customized instance partitioning, according to at least some embodiments. In Approach A, representing the nested virtualization scenario, virtualization host 310A comprises a set of hardware devices 320A and baseline hypervisor 322 which does not support custom partitioning of compute instances. A parent compute instance 330 may be launched by the baseline hypervisor 322. In order to create a nested compute instance 332, a second-level hypervisor 334 may be instantiated within the parent compute instance 330. The second-level hypervisor 334 may for example comprise one or more processes within the address space of the parent compute instance 330 in some implementations. When a process within the parent compute instance 330 has to access a hardware device 320A, a software pathway similar to 371A may be used—an access request may be sent to the baseline hypervisor 322, and the baseline hypervisor 322 in turn may access the hardware device and provide the response obtained from the hardware device back to the process. In contrast to path 371A, which comprises two "hops", a three-hop path similar to 371B may be traversed for a process within the nested compute instance 332 to access hardware devices 320A, with both the second-level hypervisor 334 and the baseline hypervisor 322 being included in the path. This extra level of indirection may result in a substantial performance overhead in at least some implementations; as a result, applications running with a nested compute instance 332 may not be as performant as similar applications running within the parent compute instance 330 when nested virtualization approach A is used.

In Approach B, representing customized instance partitioning, virtualization host 310B includes similar hardware devices 320B and a partitioning-supporting hypervisor (similar in features and functionality to VMCs 222 of FIG. 2). Parent compute instance 350 launched at virtualization host 310B does not require a second-level hypervisor which acts as an intermediary along the path between child compute instances and the hardware devices 320B. After child compute instances 351A and 351B are created, the paths 371D to access hardware devices from the CCIs 351 are similar in length or hops to the path 371C for accessing hardware devices from parent compute instance 350. As a result, applications running within the CCIs 351B may be as performant as similar applications running within parent compute instance 350 when customized instance partitioning is used in at least some embodiments. Note that the child instances manager tool and the instance partitioning manager, which may be used during the setup of the CCIs and for handling administrative operations associated with the CCIs, may not participate in, or be used for, the data plane operations performed by applications running at the CCIs and/or the parent compute instance in various embodiments.

Example Workflows for Launching PPCIs and CCIs

Figure 4:
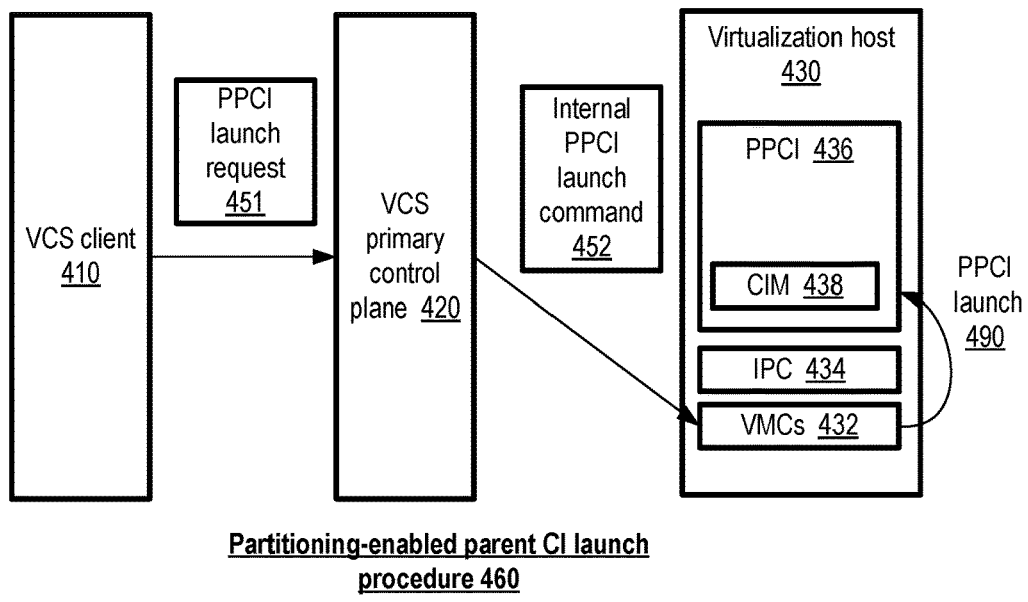
FIG. 4 illustrates example operations that may be performed to launch a parent compute instance and a child compute instance, according to at least some embodiments.
Figure 4:
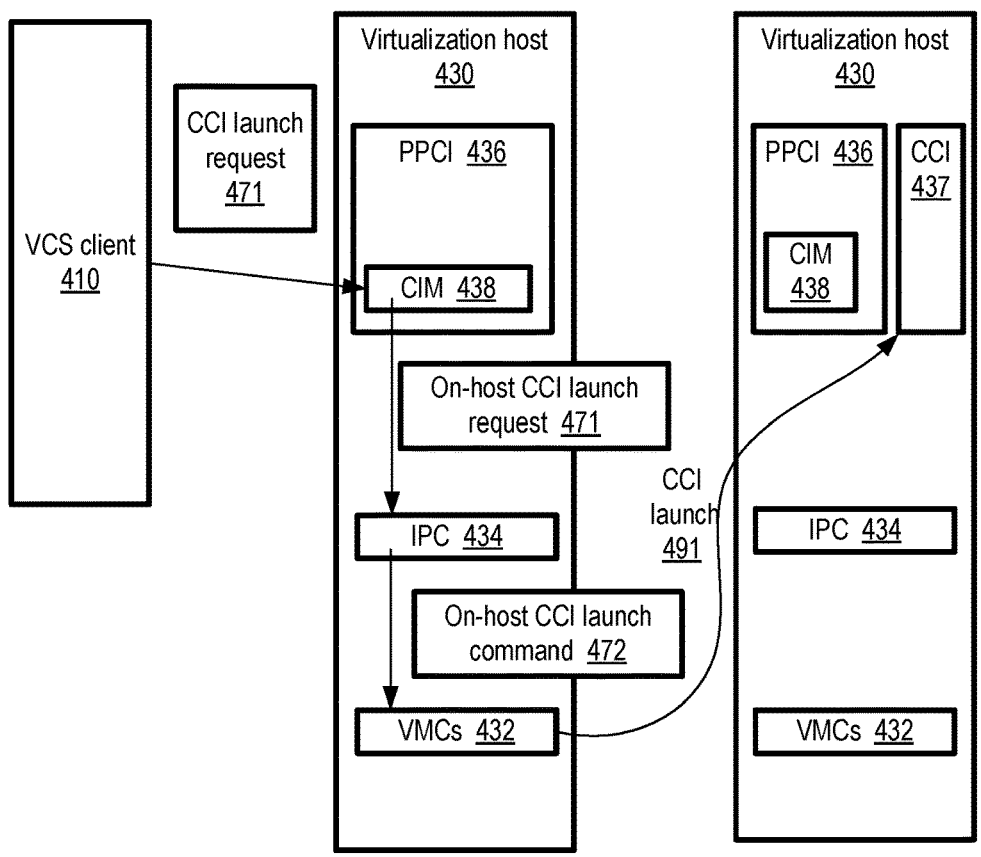

The workflow of interactions and operations required to set up a partitioning-enabled parent compute instance may differ from the workflow for setting up a child compute instance in various embodiments. FIG. 4 illustrates example operations that may be performed to launch a parent compute instance and a child compute instance, according to at least some embodiments. A partitioning-enabled parent compute instance (PPCI) launch procedure 460 may be initiated by a VCS client 410 by sending a launch request 451 to the primary control plane 420 of the VCS in the depicted embodiment. A number of operations pertaining to the PPCI launch request may be performed at the primary control plane 420, such as validating/authenticating the request, provisioning/identifying the virtualization host 430 to be used for the PPCI, and so on. After such operations are successfully completed, an internal PPCI launch command 452 may be sent to the virtualization management components (VMCs) 432 of the selected virtualization host 430. The VMCs 432 may launch one or more instance partitioning controllers (local control plane components) (IPCs) 434 at the virtualization host in some embodiments. A set of resources may be identified and allocated for the requested PPCI 436, and the PPCI 436 may be launched at the virtualization host 430 by its VMCs 432 as indicated by arrow 490. Within the PPCI 436, for example as part of its initialization procedure, a child instances manager (CIM) tool 438 may also be launched in at least some embodiments, so that clients may submit requests for CCIs when desired.

Child compute instance (CCI) launch procedure 461 may be triggered by a client 410 sending a CCI launch request 471 to the CIM 438, e.g., from within a process running at the PPCI 436. An on-host CCI launch request may be sent from the CIM 438 to the IPC 434. The IPC 434 may approve or validate the request, e.g., based on analysis of locally-stored resource allocation metadata, and transmit an on-host CCI launch command 472 to the VMCs 432. The VMCs may then launch the CCI 437 as indicated by arrow 491, allocating a subset of the PPCI 436's resources to the CCI. As indicated in FIG. 4, communications with the primary control plane 420 may not be required for the launch of the CCI 437, thus potentially shortening the overall launch time of the CCI. In at least some embodiments, less work may be required from the IPC 434 for approving a CCI launch than is required from the primary control plane 420 for approving a PPCI launch.

Example CCI Launch Request Elements

Figure 5:
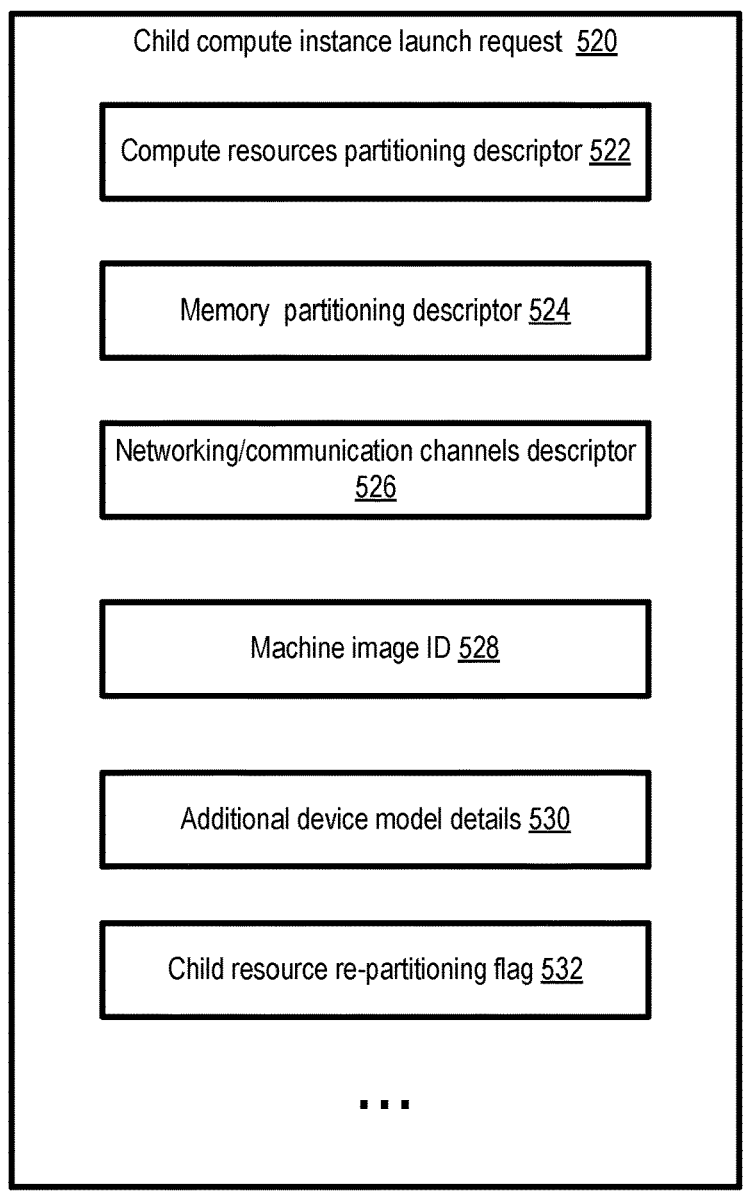
FIG. 5 illustrates example elements of launch request for a child compute instance, according to at least some embodiments.

FIG. 5 illustrates example elements of launch request for a child compute instance, according to at least some embodiments. As shown, a child compute instance launch request 520 may include a number of parameters or elements specifying desired properties of the CCI. Compute resources partitioning descriptor 522 may indicate the subset of compute resources (e.g., virtualized CPUs and/or virtualized graphical processing units or GPUs) of the partitioning-enabled parent compute instance (PPCI) to be set aside for the CCI. For example, from among N virtual CPUs of the PPCI, (N−k) virtual CPUs may be designated for use by the CCI. Memory partitioning descriptor 524 may similarly indicate the size of the memory to be allocated to the CCI—e.g., from among M gigabytes of memory, (M−j) gigabytes may be allocated to the CCI at the client's request. Compute resources and memory represent examples of the plurality of resource categories for which respective capacities may be allocated to CCIs in various embodiments. In at least one embodiment, a client may, if desired, overcommit some categories of resources. For example, with respect to at least one resource category (e.g., memory) of a plurality of categories of resources allocated to the CCI, the sum of the resource capacities allocated to the CCI (and any other CCIs of the same family) and the PPCI may exceed at least the initial resource capacity assigned to the PPCI prior to the launch of the CCI.

According to at least some embodiments, a VCS client may provide descriptors 526 of one or more networking or communication channels to be set up for the requested CCI. Local communication channels may be set up for communications between the CCI and other compute instances (e.g., the PPCI, or other CCIs of the same PPCI) in some embodiments based on the descriptors 526. For example, in some embodiments one or more buffers of shared memory, mapped to both a CCI and another compute instance (CI), may be used for such local communications. In at least some such embodiments, an interrupt-based or notification-based communication technique may be used for bidirectional communications via such channels—e.g., a notification may be generated by the CCI when a message is ready for the other CI, and similar notifications may be used to indicate when the other CI has finished reading the buffers, when the other CI has an outbound message ready in a buffer, when the other CI has finished transmitting that outbound message, and so on. In some embodiments, such a local communication mechanism may be referred to as a "doorbell" mechanism.

For some CCIs, one or more descriptors 526 may indicate networking requirements for communicating with entities that are not part of the local family of CCIs of the PPCI—e.g., networking requirements for communicating with services or endpoints outside the virtualization host at which the CCI is to be set up, or for communicating with other unrelated compute instances at the virtualization host may be specified. In some embodiments, such networking descriptors may indicate, for example, one or more network addresses (e.g., IP addresses) to be used for the CCI, one or more virtual network interfaces to be programmatically attached to the CCI, and so on. In at least one embodiment, networking-related resources which were initially assigned to the PPCI may be shared with, or programmatically transferred to, a CCI based on the contents of descriptors 526. For example, one or more of a set of IP addresses assigned to the PPCI may be transferred to the CCI, a virtual network which was attached to the PPCI may be detached and attached to the CCI instead, and so on.

In at least some embodiments, a VCS client may indicate an identifier 528 of a machine image to be used for the CCI in launch request 520. Additional details 530 regarding the desired device model to be employed for the CCI (e.g., the kinds of software or virtual devices to be set up for the CCI) may be included in the launch request 520 in some embodiments. Such details may be referred to as a device model specification in the depicted embodiment.

According to one embodiment, a client may indicate, via a flag 532, whether further partitioning of resources allocated to the requested CCI is to be permitted. If child resource re-partitioning flag 532 is set to TRUE, for example, a child instances manager may be launched within the requested CCI, and child CCIs of the requested CCI may later be set up, in effect enabling a hierarchy of child CCIs to be created. Thus, using a subset S1 of a PPCI's resources, CCI1 may be created, and then using a subset of CCI1's resources, CCI2 may be created, and so on, if flag 532 is set appropriately. In some embodiments, elements other than those shown in FIG. 5 may be included in a request for a CCI in an environment in which customized instance partitioning is implemented at a VCS similar to VCS 110 of FIG. 1.

Example Programmatic Interactions

Figure 6:
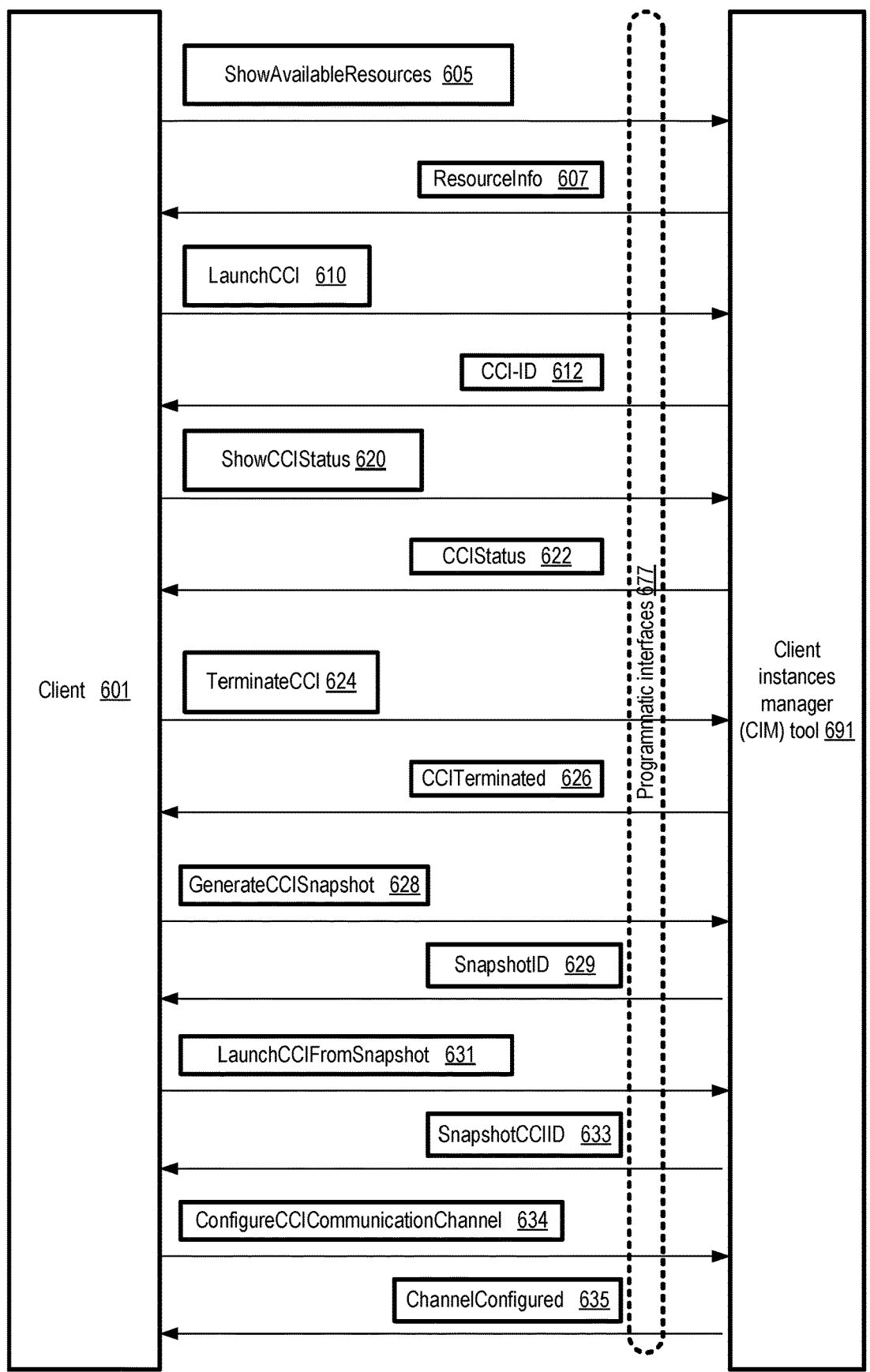
FIG. 6 illustrates example programmatic interactions related to the customized partitioning of compute instances, according to at least some embodiments.

FIG. 6 illustrates example programmatic interactions related to the customized partitioning of compute instances, according to at least some embodiments. A child instances manager (CIM) tool may implement one or more programmatic interfaces 677 in the depicted embodiment, such as a web-based console, a graphical user interface, a set of APIs, command-line tools and the like, which may be used by VCS clients 601 to submit requests pertaining to instance partitioning and receive corresponding responses. In at least some embodiments, one or more of the request types shown in FIG. 6 may instead be submitted to an intermediary (e.g., another program running at a partitioning-enabled parent compute instance (PPCI), or a component of the primary control plane of the VCS), and transmitted by the intermediary to the CIM.

A client 601 may submit a ShowAvailableResources request 605 to the CIM 691 in the depicted embodiment to determine the set of resources of the PPCI that are currently available for potential partitioning to child compute instances. In response, the CIM, which may have access to local resource allocation metadata at the virtualization host at which the PPCI is running, or may obtain information about the local resource allocation metadata from the virtualization management components (VMCs) or the instance partitioning controller (IPC) of the virtualization host, may send the requested information in a ResourceInfo message 607.

A LaunchCCI request 610, specifying various desired properties and resource needs of a child compute instance (CCI) (e.g., using elements/parameters similar to those shown in FIG. 5), may be submitted by client 601 to the CIM 691 to set up a CCI. In response, as discussed earlier, the CIM may forward, or send a modified version of, the launch request to an instance partitioning controller (IPC) running at the virtualization host, which may be responsible for validating or checking the request. If the request is approved by the IPC, the IPC may in turn send one or more commands to launch a CCI with the requested characteristics to the VMCs (e.g., to a hypervisor) of the virtualization host, which may use techniques such as hot-plugging, ballooning and the like to allocate resources for the requested CCI. An identifier of the CCI launched by the VMCs may be returned to the client 601 in a CCI-ID message 612 in some embodiments.

Information about the current state of a CCI may be requested via a ShowCCIStatus request 620 in some embodiments. The requested state information, such as whether the CCI is up and running, whether the CCI is paused, the amounts of resources of various kinds (e.g., memory, virtual CPUs, etc.) allocated to the CCI, the software/virtual devices allocated or programmatically attached to the CCI (e.g., virtual network interfaces, virtual storage devices such as volumes, etc.), information about local communication channels, etc., may be provided in one or more CCIStatus messages 622.

A client 601 may request termination or shutdown of a CCI by submitting a TerminateCCI request 624 in various embodiments. In response, the CCI may be terminated, its resources may be freed (e.g., re-allocated to the PPCI), and a CCITerminated message 626 may be sent to the client in some embodiments.

In some embodiments, a client 601 may wish to save the state of a given CCI (e.g., the contents of the memory and various software devices) and re-start the CCI later at the same virtualization host or at a different virtualization host. A GenerateCCISnapshot request 628 may be submitted to the CIM to cause a snapshot representing the state of the CCI to be saved (e.g., at a local storage device of the virtualization host, or at a remote storage device) in some embodiments. An identifier of the snapshot may be provided to the client 601 in a SnapshotID message 629 in such embodiments. If/when the client wishes to re-start the CCI from its saved state, a LaunchCCIFromSnapshot request 631 may be submitted. If the request is approved (e.g., if the resources that were allocated for the CCI whose state was saved), the saved snapshot may be used to launch the requested CCI, and the identifier of the newly-recreated CCI may be sent to the client in a SnapshotCCIID message 633 in some embodiments.

In at least one embodiment, a client 601 may request establishment of one or more communication channels for an existing CCI by submitting a ConfigureCCICommunicationChannel request 634 via programmatic interfaces 677 to a CIM 691. Properties of the channel (e.g., which types of entities the CCI is to communicate with using the channel, the required performance characteristics of the channel, the communication mechanism (such as Internet Protocol-based messaging, shared memory, etc.) to be used, etc.) may be specified. If the request is approved (e.g., by the IPC or the VMCs), the channel may be created and a ChannelConfigured response 635 may be provided to the client. In at least some embodiments, the ChannelConfigured response may include an indication of the status of the created channel (e.g., indicating that the channel was created successfully and is available for use) and/or configuration information about the created channel. For example, in some embodiments an address or identifier to be used to submit messages via the channel or to receive messages via the channel may be automatically generated, and an indication of the address/identifier may be provided in the ChannelConfigured response. In one embodiment, such configuration settings may be specified in the ConfigureCCICommunicationChannel request by the client instead of being automatically generated by components of the system, and the ChannelConfigured message may indicate that the requested settings are being used. Other types of programmatic interactions pertaining to custom partitioning of compute instances and the management of the child instances created as a result of such partitioning, not shown in FIG. 6, may be supported in at least one embodiment. Note that in some embodiments, the CIM tool 691 may have to communicate with other components at the host (such as an IPC or the VMCs) to respond to some types of programmatic requests from the client 601, while other types of requests may be handled by the CIM 691 without communicating with other components external to the PPCI.

Example Modes for Configuring Instance Partitioning Controllers

Figure 7:
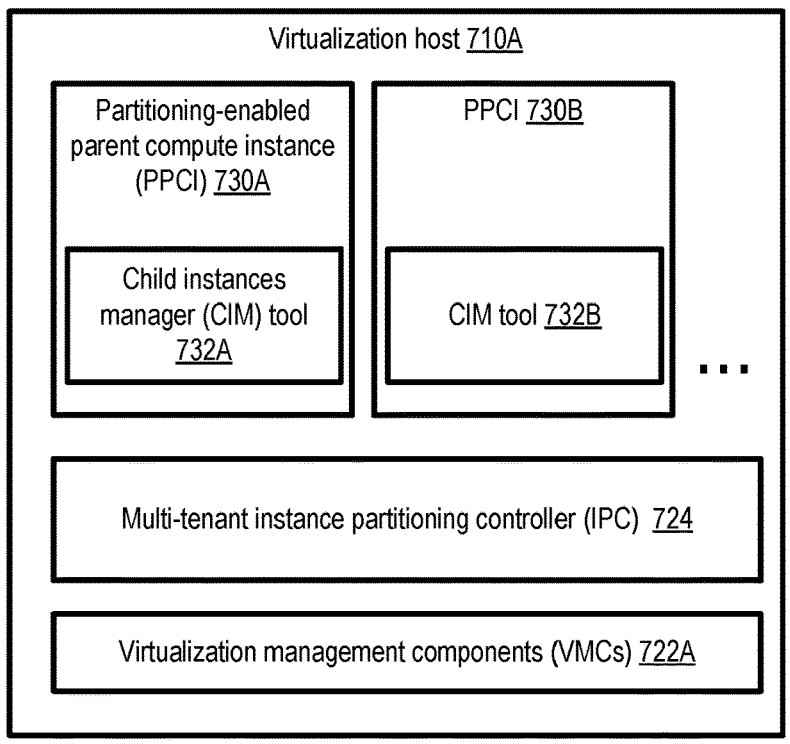
FIG. 7 illustrates example configurations of instance partitioning controllers at a virtualization host, according to at least some embodiments.
Figure 7:
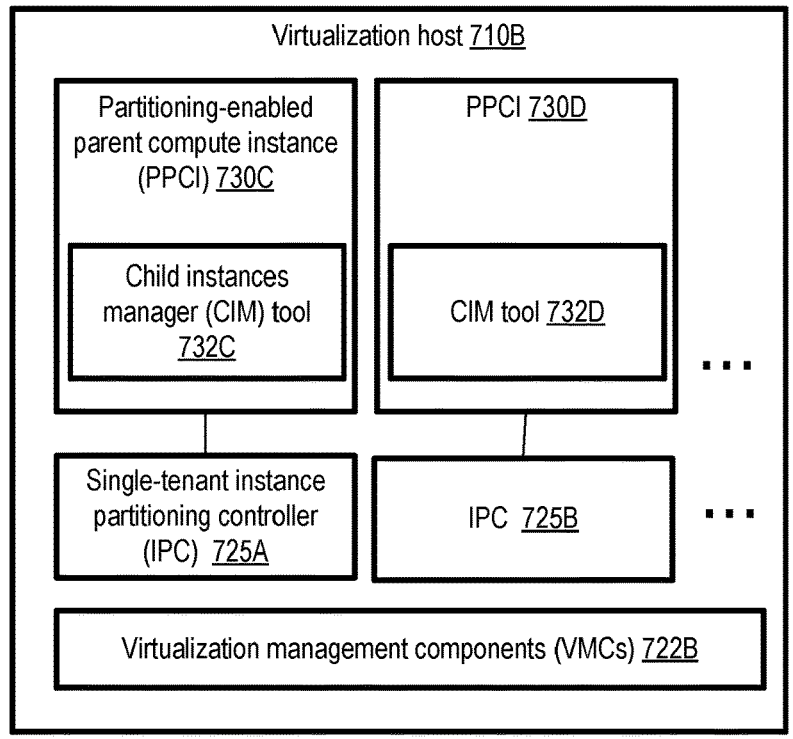

FIG. 7 illustrates example configurations of instance partitioning controllers at a virtualization host, according to at least some embodiments. At virtualization host 710A of a virtualized computing service similar to VCS 110 of FIG. 1, a multi-tenant instance partitioning controller configuration (IPC) 701 may be used in the depicted embodiment. A plurality of partitioning-enabled parent compute instances (PPCIs) such as 730A and 730B are set up at host 710A by virtualization management components 722A, e.g., on behalf of the same VCS client or respective VCS clients. Each of the PPCIs 730A and 730B may comprise a respective CIM tool 732 (e.g., 732A or 732B). A single multi-tenant instance partitioning controller 724 may respond to CCI configuration requests from multiple PPCIs including 730A and 730B in the depicted embodiment. The multi-tenant IPC 724 may be launched, for example, prior to the launch of at least some of the PPCIs by the VMCs 722A of the host 710A in some implementations. In other implementations, the IPC may be launched after, or at the time that, the first PPCI is requested at the virtualization host 710A. In order to handle requests pertaining to CCIs of different PPCIs, the multi-tenant IPC 724 may potentially maintain or access metadata pertaining to several different VCS clients (e.g., including client account identifiers, which may be checked to validate CCI requests) in at least some embodiments.

In another approach, e.g., to cleanly separate or isolate the local control plane operations on behalf of different VCS clients, the single-tenant IPC configuration 702 may be used at a virtualization host 710B. As before, the host 710B may also be used for multiple PPCIs such as 730C and 730D, each comprising a respective CIM tool such as 732A or 732D. VMCs 722B may be responsible for launching the PPCIs, and also for launching a respective IPC for each of the PPCIs in the depicted embodiment. Thus, IPC 725A may be launched for PPCI 730C, while IPC 725B may be launched for PPCI 730D in the example scenario shown in FIG. 7. In at least one implementation, IPC 725A may be launched by VMCs 722B when PPCI 730C is requested or launched, while IPC 725B may be launched by VMCs 722B when PPCI 730D is requested or launched. In another implementation, a pool of single-tenant IPCs may be created in advance, and individual IPCs of the pool may be assigned to the PPCIs as needed. In one embodiment, a hybrid IPC configuration may be used at a virtualization host—e.g., if two PPCIs are set up for the same VCS client at the host, both PPCIs may share one IPC, while another IPC may be launched for a PPCI set up on behalf of a different client at the same host.

Example Applications Run Using CCIs

CCIs established using the techniques introduced above may be utilized for a number of different types of applications and workloads in various embodiments. FIG. 8*a*, FIG. 8*b*, FIG. 9*a* and FIG. 9*b* collectively illustrate example categories of child compute instances which may be set up at virtualization hosts, according to at least some embodiments.

Figure 8A:
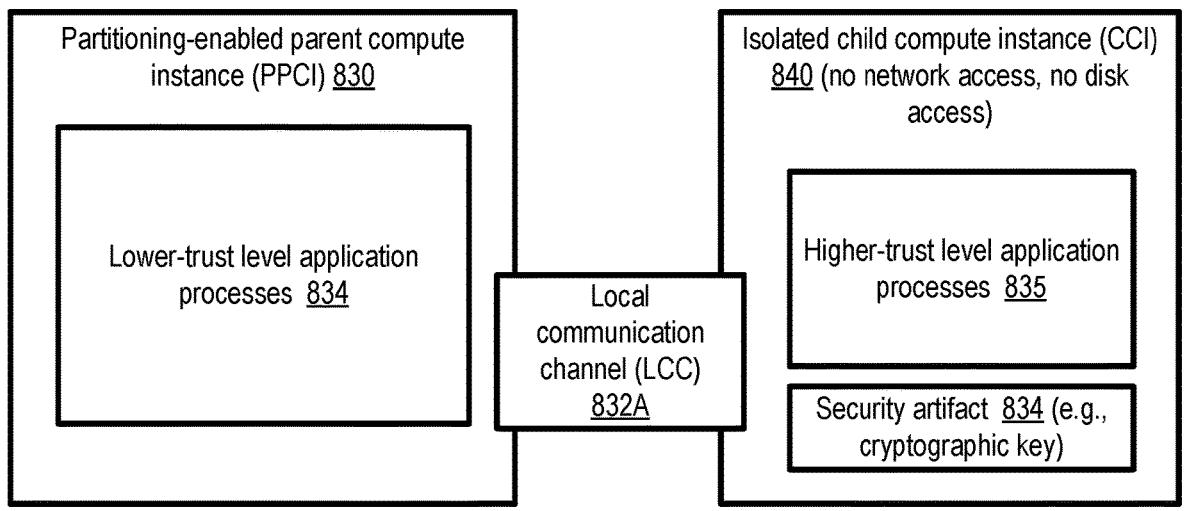
FIG. 8a, FIG. 8b, FIG. 9a and FIG. 9b collectively illustrate example categories of child compute instances which may be set up at virtualization hosts, according to at least some embodiments.

In the embodiment depicted in FIG. 8*a*, a CCI 840 may be configured primarily to perform sensitive computations that require a higher security level than computations run within the PPCI (or within other CCIs with the same PPCI). As shown, a set of lower trust-level application processes 834 may be run within PPCI 830, while higher trust-level application processes 835 may be run within an isolated CCI 840. Configuration settings of the CCI 840 may prohibit network communications between the CCI and any endpoints in some embodiments, e.g., to eliminate network-based attacks which may otherwise potentially allow security artifacts 834 used by the processes 835 to be accessed by attackers. Similarly, in at least one embodiment, access to persistent storage devices may also be prohibited for the CCI 840 to enhance security, so that security artifacts 834 cannot be copied from persistent storage by attackers. In various embodiments, a local communication channel (LCC) 832A (e.g., comprising one or more shared memory buffers of the kind discussed above) may be used to interact with the isolated CCI 840. In one implementation, a communication intermediary process may be launched within the PPCI 830, and communications to/from the CCI 840 may pass through the intermediary process. For example, a secure communication session similar to a Transport Layer Security (TLS) session may be set up, with the help of the intermediary process, between a source of a security artifact (such as a key management service of a provider network) and the CCI 840 to enable the transfer of the security artifact 834 to the isolated CCI 840. In some cases, isolated CCIs may be terminated automatically after their secure computations are completed, or after the expiration of a timeout interval, to further reduce the probability of leakage of sensitive data.

Figure 8B:
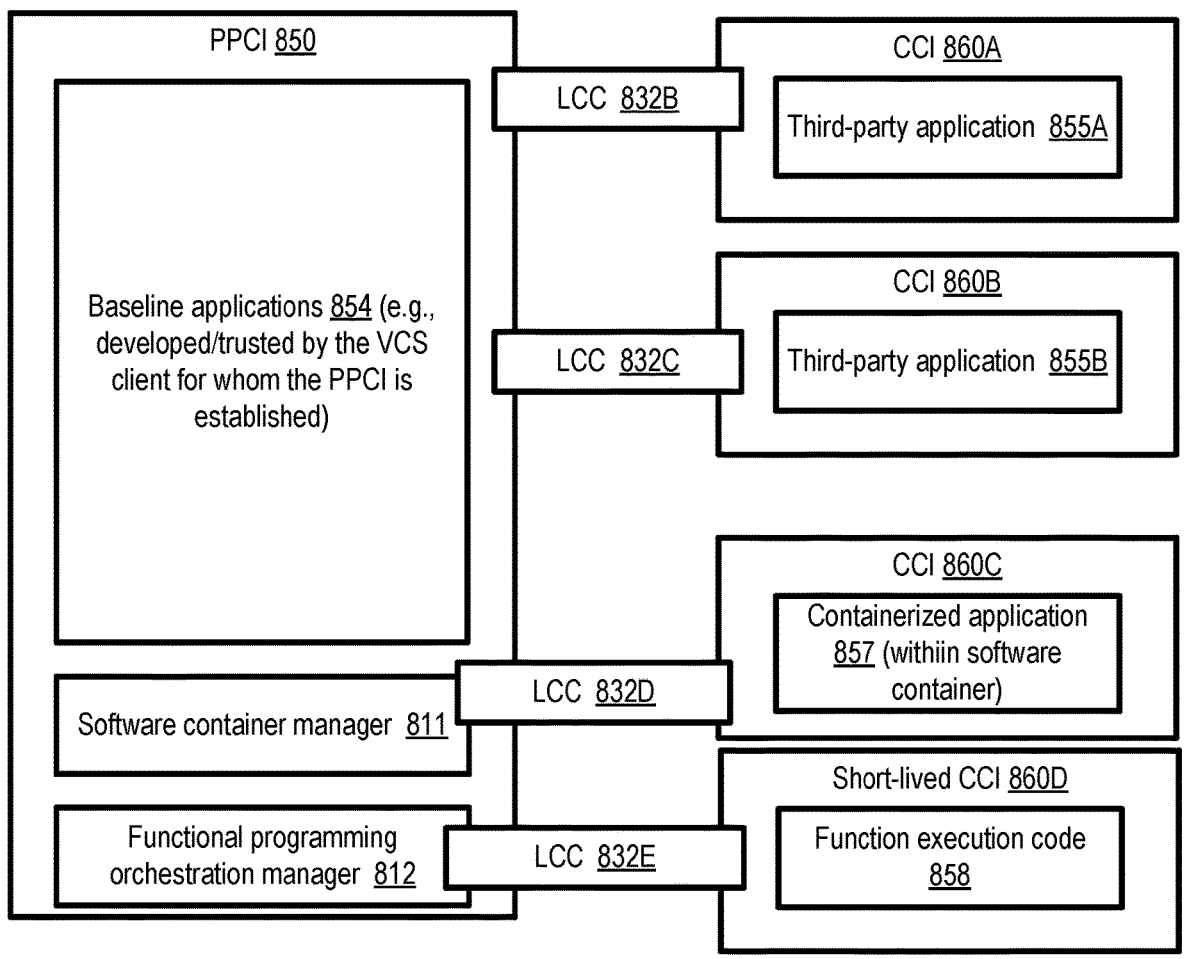

In FIG. 8*b*, several different kinds of applications that may be suitable for execution within CCIs are shown. A PPCI 850 may be established on behalf of a VCS client, and used to run a set of baseline applications 854 which may have been developed by the VCS client and therefore are trusted for execution in the primary compute instance set up on the virtualization host. Some of the applications that are to be run on behalf of the VCS client at the virtualization host of the PPCI 840 may have been developed by third parties, and the VCS client may wish to isolate the execution environments of such third party applications from the PPCI 850 (e.g., because the third party applications are less trusted than the baseline applications 854). Accordingly, using the kinds of techniques discussed earlier, respective CCIs 860A and 860B may be set up for third party applications 855A and 855B in the depicted embodiment, and local communication channels (LCCs) 832B and 832C could be established for interactions between the third-party applications and the PPCI 850.

The PPCI 850 may also include at least two other components in the depicted embodiment: a software container manager 811, and a function programming orchestration manager 812 (which may each comprise one or more processes or threads of execution). A CCI 860C may be set up to run a containerized application 857 within a software container established at the CCI 860C with the help of the container manager 811, and an LCC for communication between the PPCI and the CCI 860C may be configured. For example, the VCS client on whose behalf the PPCI is set up may provide an indication of a software container image to be used for application 857, and the container manager 811 may request the launch of CCI 860C and use the container image to start the container within CCI 860C.

Some relatively short-duration applications may be implemented using the functional programming methodology in the depicted embodiment with the help of the functional programming orchestration manager 812. The orchestration manager 812 may receive programmatic representations of functions to be implemented to perform a computation on behalf of the VCS client. In response to receiving such a representation, in at least some embodiments the orchestration manager 812 may launch a short-lived CCI 860D, and cause the function to be executed or implemented at CCI 860D (e.g., using function execution code 858 provided by the client and transmitted via LCC 832E to the CCI 860D). After the function has been executed, the CCI 860D may be terminated in at least one embodiment. Note that the three types of applications shown running at respective CCIs (third-party applications 855, containerized applications 857, and applications imple- mented using the functional programming model) may not necessarily be run at the same virtualization host in various embodiments.

Figure 9A:
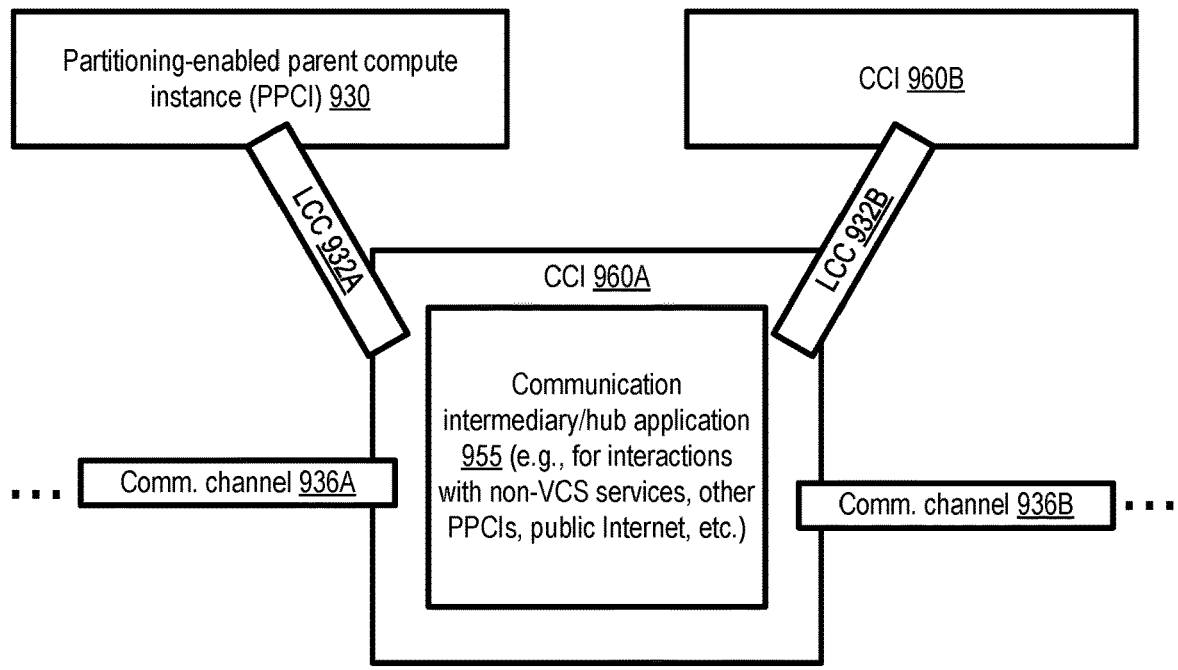

In the embodiment depicted in FIG. 9*a*, an application 955 at a particular CCI 960A associated with a PPCI 930 may be configured to act as a communication hub or intermediary between some number of compute instances of the family of instances set up using the resources assigned to the PPCI 930 (such as CCI 960A and the PPCI 930). Thus, for example, when a message is to be sent from CCI 960B to PPCI 930, the message may first be sent via an LCC 932B to the CCI 960A, processed at the hub application 955, and then sent on (in its original form, or after a transformation) to PPCI 930 via LCC 932A. In some embodiments, the hub application of CCI 960A may also or instead be used for communications between (a) one or more of the other compute instances running at the virtualization host (e.g., PPCI 930 and/or its other CCIs) and (b) endpoints external to the virtualization host, such as non-VCS services including storage/database services of the provider network at which the VCS is implemented, other PPCIs at the same host or other hosts, devices of the public Internet, and so on. For some of these types of communications, network communication channels such as 936A and 936B may be established, e.g., using IP addresses and/or virtual network interfaces programmatically attached to CCI 960A. By offloading communication-related operations to the hub application, a clean separation of at least some types of communication-related logic from the other applications being run at the PPCI and/or the other CCIs may be achieved in various embodiments, and/or overall security may be enhanced by reducing the number of compute instances involved in network communications.

Figure 9B:
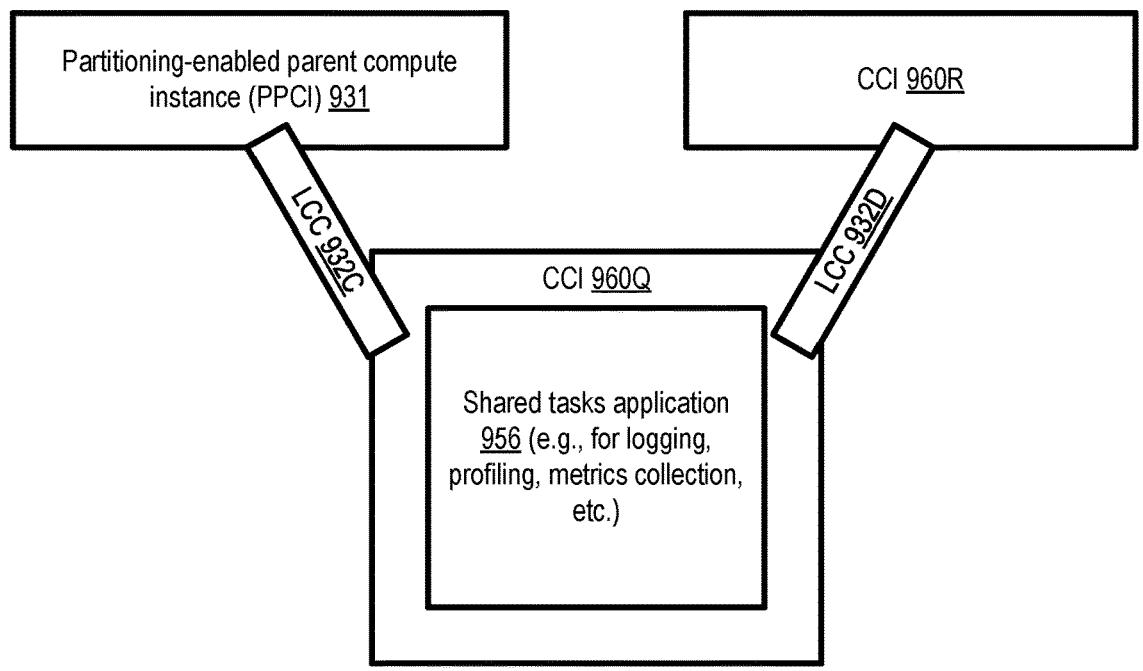

In at least some embodiments, as shown in FIG. 9*b*, a CCI 960Q may be set up to run applications implementing shared tasks which may be required with respect to various other compute instances, such as logging, profiling, metrics collection etc. In the absence of a dedicated CCI such as 960Q, such operations may otherwise have to in effect be replicated at each of various other CCIs (such as CCI 960R) and/or the PPCI 931. In effect, in such embodiments, such common types of tasks may be offloaded to a shared tasks application 956, instead of running similar common tasks within the other CIs of the host. In at least some embodiments, CCIs set up using the partitioning techniques described earlier may be used for various other types of applications not shown in FIG. 8*a*, FIG. 8*b*, FIG. 9*a* or FIG. 9*b*. In at least some embodiments, combinations of the kinds of applications depicted in FIG. 8*a*, FIG. 8*b*, FIG. 9*a* or FIG. 9*b* may be run using a family of CCIs of a given PPCI at a given host.

Methods for Custom Partitioning of Compute Instances

Figure 10:
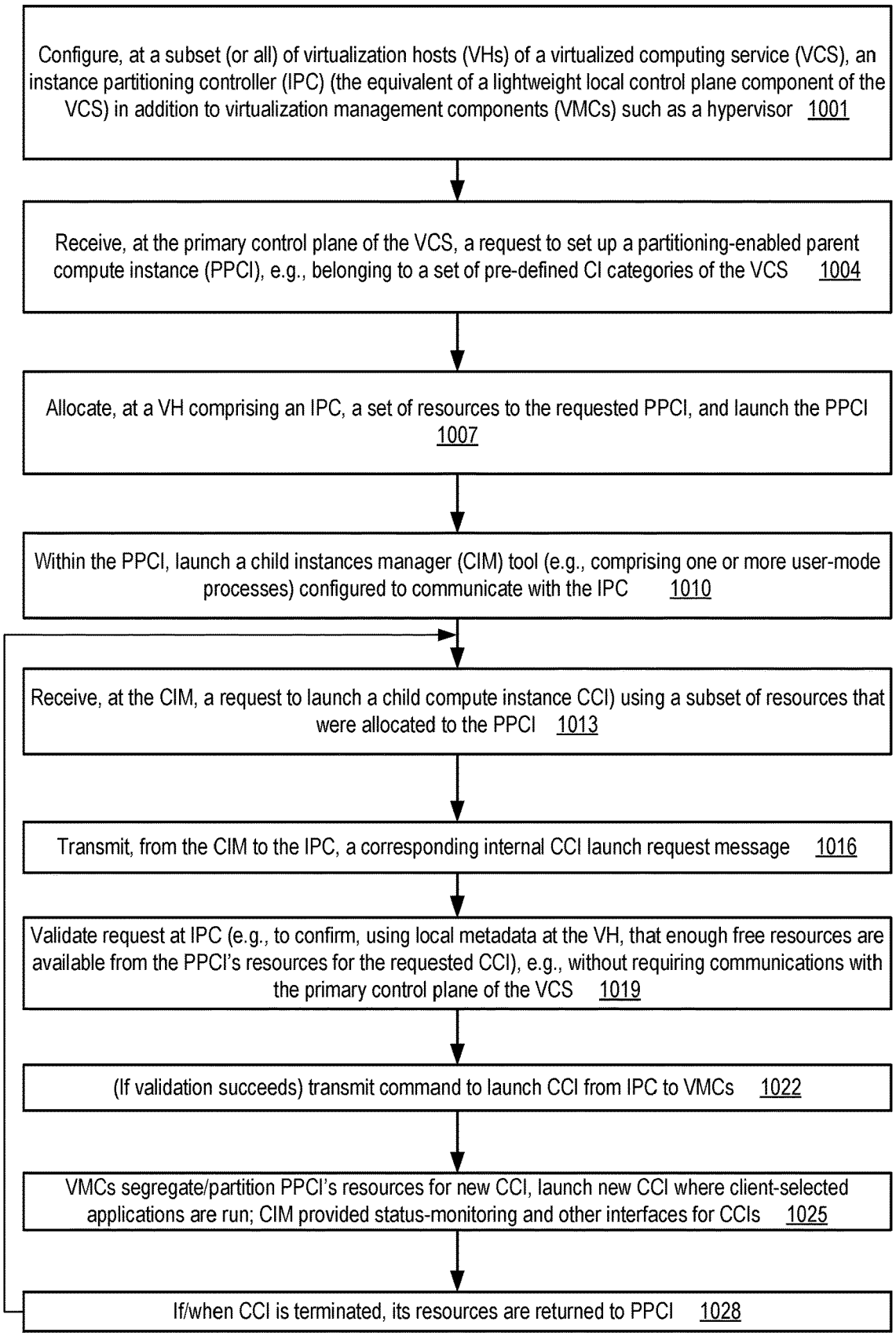
FIG. 10 is a flow diagram illustrating aspects of operations that may be performed to implement customized partitioning of compute instances, according to at least some embodiments.

FIG. 10 is a flow diagram illustrating aspects of operations that may be performed to implement customized partitioning of compute instances, according to at least some embodiments. As shown in element 1001, at some or all of the virtualization hosts (VHs) of a virtualized computing service (VCS) similar in functionality and features to VCS 110 of FIG. 1, one or more instance partitioning controllers (IPCs) may be launched in addition to virtualization management components (VMCs) such as a hypervisor. The IPCs may be considered local lightweight control plane components of the VCS, configured to perform request validation and or a subset of other administrative tasks similar to that normally performed at the primary control plane servers of the VCS. The IPCs may be deemed lightweight in that some portions of primary control plane functionality, such as host provisioning, certain types of networking configuration setup operations performed for the physical network of the VCS, and so on, may not be required from the IPCs at the VHs to implement child compute instances in at least some embodiments.

A programmatic request to set up a partitioning-enabled parent compute instance (PPCI) may be received at the primary control plane of the VCS (element 1004). The PPCI may, for example, belong to a set of predefined compute instance (CI) categories of the VCS. Each such category may, for example, be associated with a pre-selected combination of resource capacity—e.g., K1 CPUs and M1 gigabytes of memory may be allocated for an instance category Cat1, K2 CPUs and M2 gigabytes of memory may be allocated for an instance of Cat2, and so on.

A VH that (a) has sufficient free resources for the PPCI and (b) has at least one IPC may be identified by the primary control plane of the VCS in various embodiments. In some cases, the IPC may be launched after the request for the PPCI is received at the VCS. At the selected VH, a set of resources may be identified for the PPCI, and the PPCI may be launched (element 1007). In at least some embodiments, the PPCI may not include VMCs of its own (for example, a second-level hypervisor usable for supporting nested virtualization may not be incorporated within the PPCI).

A child instances manager (CIM) tool, e.g., comprising one or more user-mode processes, may be launched within the PPCI in at least some embodiments (element 1010). The CIM may present a set of programmatic interfaces which can be used, e.g., by the VCS client on whose behalf the PPCI is set up, to submit various kinds of requests pertaining to child compute instances (CCIs) of the PPCI and receive corresponding responses. The CIM may be configured to communicate with an IPC (and/or the VMCs) running at the VH to implement some client-requested CCI-related tasks in various embodiments.

A programmatic request to launch a CCI (e.g., with one or more elements/parameters similar to those discussed in the context of FIG. 5) may be received at the CIM (element 1013) in the depicted embodiment. The request may, for example, include an indication of a subset of the resources of the PPCI that are to be allocated for the CCI. A corresponding internal version of a CCI launch request message may be transmitted by the CIM to the IPC (element 1016).

The request may be validated at least in part at the IPC, e.g., using local metadata pertaining to resource allocation at the VH, without requiring communication with the primary control plane in the depicted embodiment (element 1019). For example, in one implementation, the VCS client may indicate (e.g., in the CCI request submitted to the CIM) whether over-commitment of resources is to be permitted for CCIs or not. In such an embodiment, depending on the over-commitment preferences, the IPC may check that sufficient resources are free for allocation to the CCI before sending a command to instantiate the CCI to the VMCs. Other types of validation, such as authenticating the submitter of the request, ensuring that launching of CCIs is permitted for the requesting client's account, and so on, may also or instead be performed locally at the VH by the IPC in various embodiments.

If the request is validated, a command to launch the CCI may be sent from the IPC to the VMCs (element 1022). The VMCs may segregate or partition the PPCI's resources based on the resource requirements indicated by the client, and allocate a subset or partition of the resources to a CCI launched at the VH by the VMCs in the depicted embodiment (element 1025). Any of various types of client-selected applications (such as those depicted in FIG. 8*a*, FIG. 8*b*, FIG. 9*a*, or FIG. 9*b*) may be run at the CCI, and the CIM may provide CCI status and/or other metrics as and when requested by the client. If and when a CCI is terminated, the subset of the PPCI resources which were allocated to it may be returned to the PPCI (element 1028) in at least some embodiments. Operations corresponding to elements 1013—1028 may be repeated for respective client requests for additional CCIs in the depicted embodiment.

It is noted that in various embodiments, some of the operations shown in FIG. 10 may be implemented in a different order than that shown in the figure, or may be performed in parallel rather than sequentially. Additionally, some of the operations shown in FIG. 10 may not be required in one or more implementations.

Use Cases

The techniques described above, of setting up child compute instances using partitions of resources allocated to parent compute instances, without requiring nested virtualization and with minimal interactions with the primary control plane of the virtualized computing service being used, may be useful in a variety of scenarios. As more and more different types of applications are migrated to provider network environments, the set of pre-defined compute instance categories of the provider network may not necessarily match the requirements of at least some clients very closely. By utilizing the described efficient techniques for setting up customized compute instances locally (at the same host as one of the provider network's pre-defined instances), clients may be able to implement their own diverse application-to-compute instance mappings easily.

Illustrative Computer System

Figure 11:
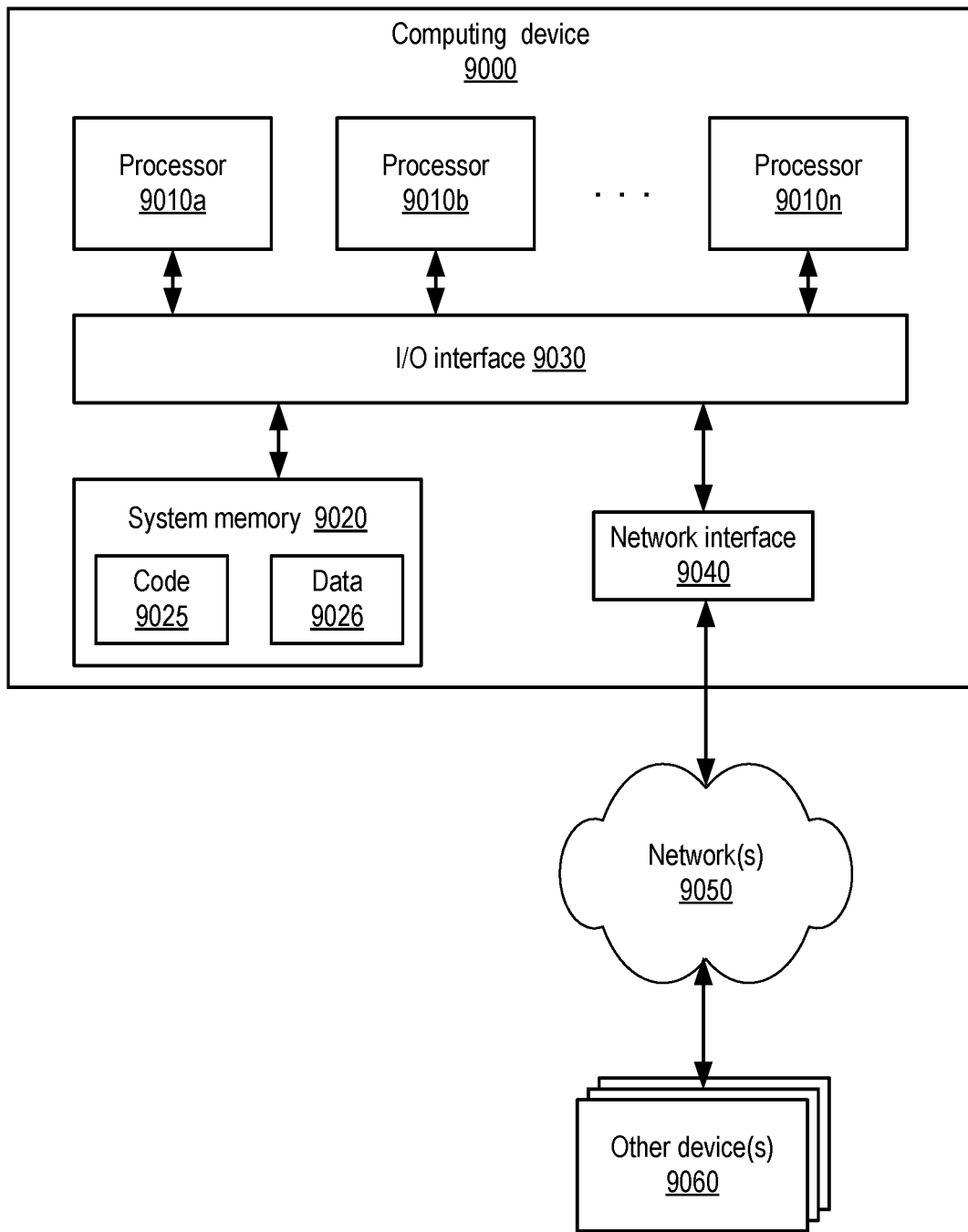
FIG. 11 is a block diagram illustrating an example computing device that may be used in at least some embodiments.

In at least some embodiments, a server that implements one or more of the techniques described herein, including for example hypervisors, instance partitioning controllers, and compute instances at virtualization hosts, control plane and/or data plane components of network-accessible services and the like may include a general-purpose computer system that includes or is configured to access one or more computer-accessible media. FIG. 11 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 10, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices of a cloud provider network;
wherein the one or more computing devices include instructions that upon execution on or across one or more processors cause the one or more computing devices to:
configure, at a virtualization host of a virtualized computing service, a hypervisor and an instance partitioning controller;
allocate, to a parent compute instance at the virtualization host by the hypervisor, a set of resources of the virtualization host in response to one or more requests directed to a primary control plane of the virtualized computing service, wherein the set includes one or more virtual processors and a memory portion, and wherein the parent compute instance does not include another hypervisor configured to implement nested virtualization;
launch, within the parent compute instance, a child instances manager comprising one or more user-mode processes;
in response to receiving, at the child instances manager, a request to establish a first child compute instance of the parent compute instance,
 transmit a child compute instance launch request from the child instances manager to the instance partitioning controller;
 validate, by the instance partitioning controller (a) using local resource allocation metadata maintained at the virtualization host and (b) without communicating with the primary control plane, the child compute instance launch request; and
 allocate, by the hypervisor in response to one or more communications from the instance partitioning controller, a subset of the set of resources to a first child compute instance launched at the virtualization host, wherein the subset includes at least one virtual processor and a part of the memory portion;
execute one or more applications within the first child compute instance; and
provide, via the child instances manager, status information of the first child compute instance to a client of the virtualized computing service.

2. The system as recited in claim 1, wherein the one or more computing devices include further instructions that upon execution on or across the one or more processors further cause the one or more computing devices to:
obtain an indication of a device model via a programmatic interface; and
configure one or more virtual devices of the first child compute instance in accordance with the indication of the device model.

3. The system as recited in claim 1, wherein the one or more computing devices include further instructions that upon execution on or across the one or more processors further cause the one or more computing devices to:
configure, based at least in part on one or more programmatic requests, one or more communication channels for messages between the first child compute instance and a second child compute instance of the parent compute instance, wherein at least one communication channel of the one or more communication channels utilizes a shared memory buffer.

4. The system as recited in claim 1, wherein, with respect to at least one category of a plurality of categories of resources allocated to the child compute instance, a sum of respective resource capacities allocated to the child compute instance and the parent compute instance exceeds a resource capacity assigned to the parent compute instance.

5. The system as recited in claim 1, wherein the one or more computing devices include further instructions that upon execution on or across the one or more processors further cause the one or more computing devices to:
allocate, to the parent compute instance by the hypervisor, one or more additional resources after the first child compute instance has been launched; and
allocate, to a second child compute instance of the parent compute instance by the hypervisor, at least a subset of the one or more additional resources.

6. A method, comprising:
performing, at one or more computing devices:
 allocating, to a parent compute instance at a virtualization host by a virtualization manager running at the virtualization host, a set of resources of the virtualization host, wherein the parent compute instance does not include a nested virtualization manager;
 launching, within the parent compute instance, a child instances manager; and
 in response to receiving, at the child instances manager, a request to establish a first child compute instance of the parent compute instance,
  transmitting a child compute instance launch request from the child instances manager to an instance partitioning controller running at the virtualization host;
  allocating, by the virtualization manager in response to one or more communications from the instance partitioning controller, a subset of the set of resources to a first child compute instance launched at the virtualization host; and
  executing one or more applications within the first child compute instance.

7. The method as recited in claim 6, further comprising performing, at the one or more computing devices:
enabling the parent compute instance to re-access the subset of resources after the first child compute instance has been terminated.

8. The method as recited in claim 6, further comprising performing, at the one or more computing devices:
configuring one or more virtual devices of the first child compute instance in accordance with an indication of a device model obtained from a client.

9. The method as recited in claim 6, further comprising performing, at the one or more computing devices:
configuring, based at least in part on a programmatic request, one or more communication channels for messages between (a) the first child compute instance and the parent compute instance, (b) the first child compute instance and another compute instance of the virtualization host, or (c) the first child compute instance and an endpoint external to the virtualization host.

10. The method as recited in claim 6, wherein the first child compute instance is not configured to communicate over a network with endpoints outside the virtualization host.

11. The method as recited in claim 6, wherein the first child compute instance is not provided access to a persistent storage device.

12. The method as recited in claim 6, further comprising performing, at the one or more computing devices:
receiving, by a functional programming manager at the parent compute instance, a representation of a function to be implemented to perform a computation;
causing, by the functional programming manager, the function to be implemented at the first child compute instance; and
terminating the first child compute instance after the function has been implemented.

13. The method as recited in claim 6, further comprising performing, at the one or more computing devices:
receiving, by a container manager of the parent compute instance, an indication of a software container selected by a client;
causing, by the container manager, the software container to be executed at the first child compute instance.

14. The method as recited in claim 6, further comprising performing, at the one or more computing devices:

obtaining, at the virtualization host via a programmatic interface, an indication of a machine image; and
launching the first child compute instance using the machine image.

15. The method as recited in claim 6, further comprising performing, at the one or more computing devices:
rejecting, by the instance partitioning controller, a request for a second child compute instance of the parent compute instance, wherein the rejecting is based at least in part on analysis of resource allocation metadata stored at the virtualization host.

16. One or more non-transitory computer-accessible storage media storing program instructions that when executed on or across one or more processors cause one or more computer systems to:
allocate, to a parent compute instance at a virtualization host by a virtualization manager running at the virtualization host, a set of resources of the virtualization host, wherein the parent compute instance does not include another virtualization manager;
allocate, by the virtualization manager in response to one or more communications from a first instance partitioning controller running at the virtualization host, a first subset of the set of resources initially allocated to the parent compute instance to a first child compute instance launched at the virtualization host at a same virtualization layer as the parent compute instance; and
execute one or more applications within the first child compute instance.

17. The one or more non-transitory computer-accessible storage media as recited in claim 16, storing further program instructions that when executed on or across the one or more processors further cause one or more computer systems to:
receive, at the first child compute instance, messages from one or more endpoints external to the virtualization host via a network; and
forward, from the first child compute instance, at least some of the received messages to one or more recipients at the virtualization host via respective local communication channels.

18. The one or more non-transitory computer-accessible storage media as recited in claim 16, storing further program instructions that when executed on or across the one or more processors further cause one or more computer systems to:
utilize, to allocate the subset of resources, a variant of one or more of: (a) memory ballooning, (b) hot-unplugging of memory, (c) processor off-lining, or (d) hot-unplugging of a processor.

19. The one or more non-transitory computer-accessible storage media as recited in claim 16, storing further program instructions that when executed on or across the one or more processors further cause one or more computer systems to:
launch a second instance partitioning controller at the virtualization host; and
allocate, by the virtualization manager in response to one or more communications from the second instance partitioning controller, a second subset of the set of resources to a second child compute instance launched at the virtualization host.

20. The one or more non-transitory computer-accessible storage media as recited in claim 16, storing further program instructions that when executed on or across the one or more processors further cause one or more computer systems to:
provide, via a programmatic interface, an indication of resources of the parent compute instance which are available for allocation to another child compute instance.

* * * * *